United States Patent
Gomez

(10) Patent No.: US 12,544,919 B2
(45) Date of Patent: Feb. 10, 2026

(54) LEARNING DEVICE, LEARNING METHOD, AND PROGRAM

(71) Applicant: HONDA MOTOR CO., LTD., Tokyo (JP)

(72) Inventor: Randy Gomez, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 116 days.

(21) Appl. No.: 18/681,878

(22) PCT Filed: Aug. 1, 2022

(86) PCT No.: PCT/JP2022/029487
§ 371 (c)(1),
(2) Date: Feb. 7, 2024

(87) PCT Pub. No.: WO2023/017753
PCT Pub. Date: Feb. 16, 2023

(65) Prior Publication Data
US 2024/0342901 A1    Oct. 17, 2024

(30) Foreign Application Priority Data
Aug. 10, 2021   (JP) ................. 2021-130725

(51) Int. Cl.
*B25J 9/16* (2006.01)
*B25J 11/00* (2006.01)
(Continued)

(52) U.S. Cl.
CPC ............. *B25J 9/163* (2013.01); *B25J 9/1653* (2013.01); *B25J 9/1689* (2013.01);
(Continued)

(58) Field of Classification Search
CPC ........ B25J 9/163; B25J 9/1653; B25J 9/1689; B25J 11/0005; B25J 13/00; G06N 20/00;
(Continued)

(56) References Cited

U.S. PATENT DOCUMENTS

| | | | |
|---|---|---|---|
| 12,374,330 B1* | 7/2025 | Surkov | .............. G10L 15/1815 |
| 2014/0201666 A1* | 7/2014 | Bedikian | ............... G06F 3/0325 |
| | | | 715/771 |

(Continued)

FOREIGN PATENT DOCUMENTS

JP    2022-029599    2/2022

OTHER PUBLICATIONS

International Search Report and Written Opinion for International Application No. PCT/JP2022/029489 mailed on Oct. 25, 2022, 8 pages.

(Continued)

*Primary Examiner* — Sohana Tanju Khayer
(74) *Attorney, Agent, or Firm* — Amin, Turocy & Watson, LLP

(57) ABSTRACT

A learning device includes: an acquisition unit configured to acquire a recognition result by recognizing intention indication information of a user who uses a communication robot; a presentation unit configured to select a plurality of action sets corresponding to the recognition result on the basis of the acquired recognition result and to present the selected plurality of action sets to a remote operator who remotely operates the communication robot from a remote location; an operation result detecting unit configured to detect a selection state of the remote operator for the presented plurality of action sets; and a learning unit configured to determine a reward in learning on the basis of the detected selection state of the remote operator and to learn a response to the user's action.

9 Claims, 21 Drawing Sheets

(51) Int. Cl.
*B25J 13/00* (2006.01)
*G06N 20/00* (2019.01)
*G06V 40/10* (2022.01)
*G06V 40/20* (2022.01)
*G16Y 40/20* (2020.01)
*G16Y 40/30* (2020.01)

(52) U.S. Cl.
CPC ........... *B25J 11/0005* (2013.01); *B25J 13/00* (2013.01); *G06N 20/00* (2019.01); *G06V 40/10* (2022.01); *G06V 40/20* (2022.01); *G16Y 40/20* (2020.01); *G16Y 40/30* (2020.01)

(58) Field of Classification Search
CPC ........ G06V 40/10; G06V 40/20; G16Y 40/20; G16Y 40/30; G16Y 20/40; G10L 15/10
See application file for complete search history.

(56) References Cited

U.S. PATENT DOCUMENTS

| | | | | |
|---|---|---|---|---|
| 2017/0206064 A1* | 7/2017 | Breazeal | ................... | G06F 8/36 |
| 2018/0056520 A1* | 3/2018 | Ozaki | ..................... | G06N 3/08 |
| 2019/0236531 A1* | 8/2019 | Adato | ................... | H04N 23/611 |
| 2020/0090393 A1* | 3/2020 | Shin | ..................... | G06V 40/174 |
| 2020/0250490 A1* | 8/2020 | Ozawa | ................. | G06V 40/174 |
| 2021/0019642 A1 | 1/2021 | O'Malia et al. | | |
| 2021/0046638 A1* | 2/2021 | Moon | ..................... | B25J 9/163 |
| 2021/0142059 A1* | 5/2021 | Lee | ....................... | G06V 10/776 |
| 2021/0232150 A1* | 7/2021 | Torii | ..................... | G05D 1/249 |

OTHER PUBLICATIONS

Watkins, et al. "Q-Learning", Machine Learning, vol. 8, pp. 279-292, 1992.
Vasylkiv, et al. "Automating Behavior Selection for Affective Telepresence Robot", The 2021 International Conference on Robotics and Automation (ICRA 2021), Jun. 3, 2021, [retrieved on Oct. 14, 2022], Internet: <URL: https://www.researchgate.net/publication/352091376_Automating_Behavior_Selection_for_Affective_Telepresence_Robot>, <DOI:10.1109/ICRA48506.2021.9560755>.
International Search Report and Written Opinion for International Application No. PCT/JP2022/029487 mailed on Oct. 25, 2022, 8 pages.

* cited by examiner

FIG. 6

|      | Class Name |      | Class Name |      | Class Name |
|------|-----------|------|-----------|------|-----------|
| Face | Anger     | Body | Waving    | Body | Thinking  |
| Face | Disgust   | Body | Bowing    | Body | Rejection |
| Face | Fear      | Body | Photo     | Body | Applauding |
| Face | Happiness | Body | Telephone | Body | Walking   |
| Face | Sadness   | Body | Jumping   | Body | Standup   |
| Face | Surprise  | Body | Laughing  | Body | Sitdown   |
| Face | Neutral   | Body | Ashamed   | Body | Sitting   |
|      |           | Body | BeQuiet   | Body | Standing  |
|      |           | Body | Teasing   |      |           |

FIG. 7

| Speech input | Class Name |
|---|---|
| You are so cute, I like you,... | Endearment |
| See you soon, Bye,... | Goodbye |
| I watched a movie, I'll grab a bite | Smalltalk |
| Turn the light on, Stop,... | Directive |
| I hate you, You are annoying,... | Embitterment |
| How are you, Nice to meet you,... | Greeting |
| It is sunny today, It's cold outside | Weather |

| Speech | T1 | T2 | T3 | T4 | T5 | T6 | T7 | Mean |
|---|---|---|---|---|---|---|---|---|
| Greeting | 19 | 4 | 9 | 9 | 24 | 9 | 4 | 11.14 |
| Goodbye | 20 | 25 | 5 | 15 | 5 | 20 | 10 | 14.28 |
| Engagement | 16 | 21 | 1 | 11 | 26 | 1 | 16 | 13.14 |
| Embitterment | 2 | 17 | 17 | 22 | 37 | 2 | 2 | 14.14 |
| Directive | 18 | 28 | 13 | 28 | 3 | 23 | 3 | 16.6 |
| Max. | 20 | 28 | 17 | 28 | 37 | 23 | 16 | 24.14 |

FIG. 13

| Gestures | T1 | T2 | T3 | T4 | T5 | T6 | T7 | Mean |
|---|---|---|---|---|---|---|---|---|
| Waving | 14 | 34 | 9 | 14 | 14 | 4 | 14 | 14.71 |
| Bow | 5 | 5 | 25 | 20 | 10 | 15 | 15 | 13.57 |
| Sssh | 1 | 21 | 6 | 1 | 6 | 21 | 16 | 10.28 |
| Ashamed | 27 | 2 | 12 | 2 | 2 | 12 | 2 | 8.43 |
| Laughing | 23 | 13 | 8 | 23 | 23 | 13 | 13 | 16.57 |
| Max. | 27 | 34 | 25 | 23 | 23 | 21 | 16 | 24.14 |

FIG. 14

| Emotions | T1 | T2 | T3 | T4 | T5 | T6 | T7 | Mean |
|---|---|---|---|---|---|---|---|---|
| Neutral | 13 | 20 | 27 | 34 | 13 | 20 | 41 | 20 |
| Happiness | 12 | 12 | 40 | 33 | 12 | 5 | 26 | 20 |
| Surprise | 21 | 42 | 21 | 21 | 7 | 21 | 7 | 20 |
| Sadness | 8 | 8 | 29 | 1 | 8 | 8 | 1 | 9 |
| Anger | 3 | 17 | 17 | 24 | 3 | 10 | 3 | 11 |
| Disgust | 30 | 2 | 23 | 44 | 30 | 44 | 2 | 25 |
| Contempt | 32 | 11 | 39 | 18 | 46 | 11 | 18 | 25 |
| Max. | 32 | 42 | 40 | 44 | 46 | 44 | 26 | 39.14 |

LEARNING DEVICE, LEARNING METHOD, AND PROGRAM

TECHNICAL FIELD

The present invention relates to a learning device, a learning method, and a program.

Priority is claimed on Japanese Patent Application No. 2021-130725, filed Aug. 10, 2021, the content of which is incorporated herein by reference.

BACKGROUND ART

A communication robot that can indicate feelings in various ways by performing emotional routines has been developed (for example, see Patent Document 1). In such a communication robot, a remote operator located remotely from the robot adjusts input modalities such as a look of a face, a gesture, and intention based speech of a user recognized by a perceptual system of the robot as illustrated in FIG. 24. FIG. 24 is a diagram illustrating a situation in which a remote operator sets a robot. A remote operator performs an operation to cause the communication robot to respond in an appropriate emotional routine which needs to be manually selected from a pool of available routines.

CITATION LIST

Patent Document

[Patent Document 1]
Japanese Patent Application No. 2020-132962

SUMMARY OF INVENTION

Technical Problem

However, since an amount of information which can be used by a remote operator is minimized in view of privacy protection, the operation is complicated and it takes considerable time for the remote operator to respond.

An aspect of the present invention was made in consideration of the aforementioned circumstances and an objective thereof is to provide a learning device, a learning method, and a program that can reduce a burden on a remote operator of a robot.

Solution to Problem

In order to achieve the aforementioned objective, the present invention employs the following aspects.

(1) According to an aspect of the present invention, there is provided a learning device including: an acquisition unit configured to acquire a recognition result by recognizing intention indication information of a user who uses a communication robot; a presentation unit configured to select a plurality of action sets corresponding to the recognition result on the basis of the acquired recognition result and to present the selected plurality of action sets to a remote operator who remotely operates the communication robot from a remote location; an operation result detecting unit configured to detect a selection state of the remote operator for the presented plurality of action sets; and a learning unit configured to determine a reward in learning on the basis of the detected selection state of the remote operator and to learn a response to the user's action.

(2) In the aspect of (1), the selection state of the remote operator may include a selected state and a non-selected state, and the learning unit may give a first reward to a selected action, give a negative second reward to the other actions not selected out of the plurality of action sets, and give a negative third reward which is greater than the second reward when none of the plurality of action sets are selected.

(3) In the aspect of (1) or (2), when $\gamma$ is a discount factor, $s_t$ is a state, s' is a next state of the user, a is an action with a maximum Q value with respect to s', $a_i$ is an i-th action which is selected by the communication robot and which is transmitted to the remote operator, and $Q(\cdot)$ is a Q value in Q-learning, the learning unit may use the reward $R_h$ to calculate a time difference error $\delta_t$ using a following expression:

[Math. 1]
$$\delta_t = R_h + \gamma \max_a Q(s', a) - Q(s_t, a_i).$$

(4) In the aspect of (3), the learning unit may use the time difference error $\delta_t$ to update the Q value of the action set recommended in the state $s_t$ using a following expression:

[Math. 2]
$$Q(s_t, a_i) = Q(s_t, a_i) + \alpha \delta_t.$$

(5) In the aspect of (4), the learning unit may select another action set of which the Q value is highly ranked for recommendation when a new state $s_{t+1}$ is detected at time t+1 using a following expression:

[Math. 3]
$$a \leftarrow \mathrm{argmax}_a Q(s_{t+1}, a_i)$$

(6) In the aspect of any one of (1) to (5), the intention indication information may be at least one of a speech recognition state in which utterance intention of a speech signal of the user is recognized, a look recognition state in which a motion of the user is recognized, and a gesture recognition state in which a motion of the user is recognized.

(7) In the aspect of (6), the gesture recognition state may include tracking movement of a face or a body of the user using an image in which a gesture of the user is imaged, continuously acquiring joint positions of the user, dividing a data stream into segments on the basis of characteristics of movement of a designated landmark joint, converting a new trajectory of a series of joint positions to a feature set of angles and distances when the new trajectory of a series of joint positions is prepared, rescaling acquired feature segments to standard lengths using cubic interpolation, and evaluating an acquired image of movement to acquire a necessary class label.

(8) According to another aspect of the present invention, there is provided a learning method including: causing an acquisition unit to acquire a recognition result by recognizing intention indication information of a user who uses a communication robot; causing a presentation unit to select a plurality of action sets corresponding to the recognition result on the basis of the acquired recognition result and to present the selected plurality of action sets to a remote operator who remotely operates the communication robot from a remote location; causing an operation result detecting unit to detect a selection state of the remote operator for the presented plurality of action sets; and causing a learning unit to determine a reward in learning on the basis of the detected selection state of the remote operator and to learn a response to the user's action.

(9) According to another aspect of the present invention, there is provided a program causing a computer to perform: acquiring a recognition result by recognizing intention indication information of a user who uses a communication robot; selecting a plurality of action sets corresponding to the recognition result on the basis of the acquired recognition result and presenting the selected plurality of action sets to a remote operator who remotely operates the communication robot from a remote location; causing an operation result detecting unit to detect a selection state of the remote operator for the presented plurality of action sets; and determining a reward in learning on the basis of the detected selection state of the remote operator and learning a response to the user's action.

Advantageous Effects of Invention

According to the aspects of (1) to (9), it is possible to reduce a burden on a remote operator of a robot.

According to the aspects of (8) and (9), an agent of a remote operation system is software for learning a response of an operator, and it is possible to provide software for learning a response of an operator.

BRIEF DESCRIPTION OF DRAWINGS

FIG. 6 is a diagram illustrating examples of look classes and gesture classes which are recognized by the communication robot according to the embodiment.

FIG. 7 is a diagram illustrating examples of estimated utterance intention classes according to the embodiment.

FIG. 13 is a diagram illustrating an example of the number of interactions for learning routine motions optimal for each state of a gesture modality.

FIG. 14 is a diagram illustrating an example of the number of interactions for learning routine motions optimal for each state of an emotion modality.

DESCRIPTION OF EMBODIMENTS

Figure 1:
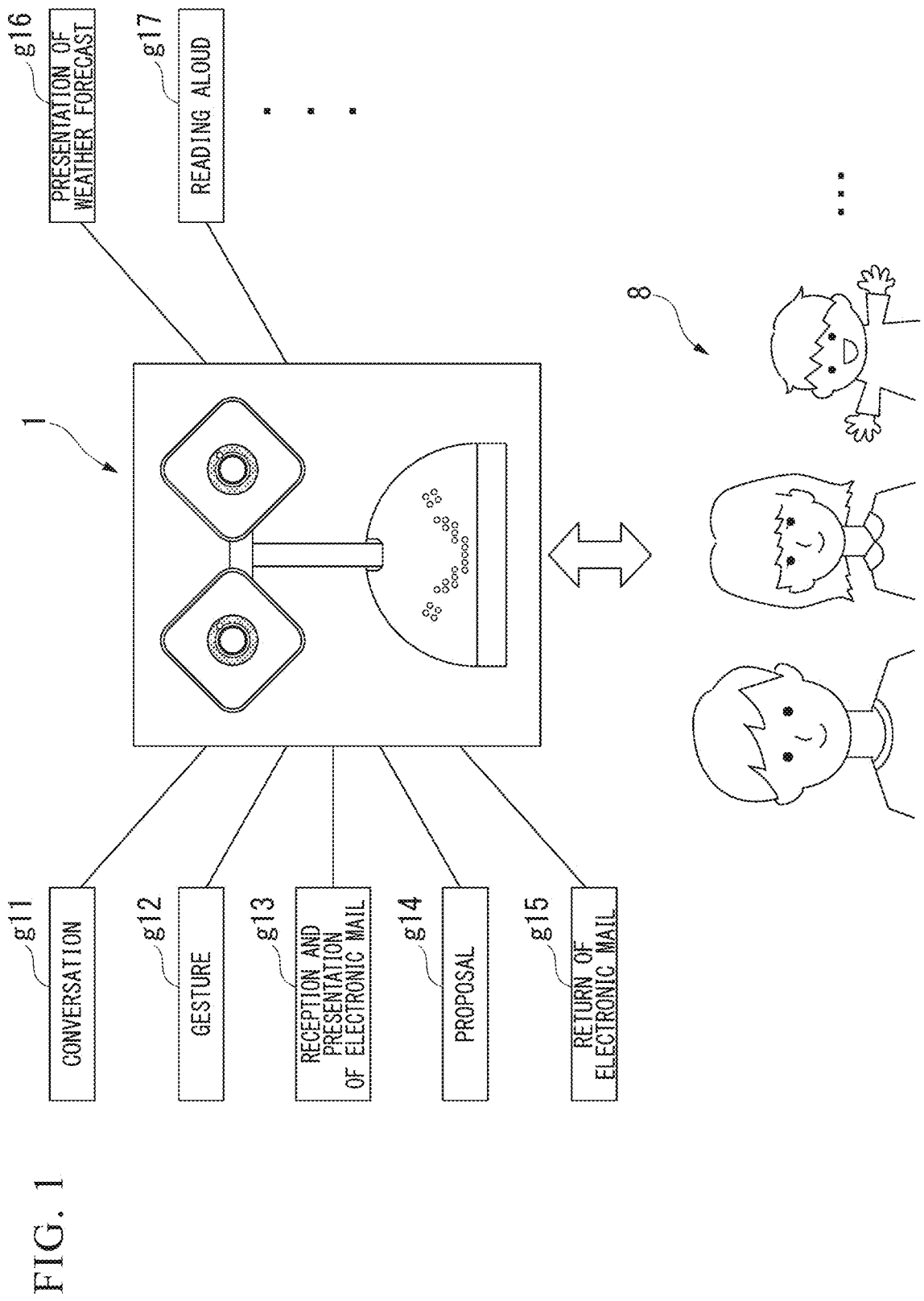
FIG. 1 is a diagram illustrating an example of communication of a communication robot according to an embodiment.

Hereinafter, an embodiment of the present invention will be described with reference to the accompanying drawings. In the drawings used for the following description, scales of elements and members are appropriately changed to allow the elements and members to be recognized easily.

<Outline>

FIG. 1 is a diagram illustrating an example of communication of a communication robot according to an embodiment. In the following description, a "communication robot" is also referred to as a "robot." A communication robot 1 performs communication with one or more persons 8. Communication mainly includes a conversation g11 and an action g12 (a motion). A motion is indicated using an image displayed on a display unit in addition to an actual motion. When an electronic mail is transmitted to a user via an internet line or the like, the communication robot 1 receives the electronic mail and notifies the user of arrival of the electronic mail and details thereof (g14). For example, when a response to the electronic mail needs to be returned, the communication robot 1 communicates with the user about whether the user wants advice and presents a proposal g14. The communication robot 1 transmits a response (g15). For example, the communication robot 1 presents a proposal g16 of a local weather forecast according to a scheduled date and time or a scheduled place of a schedule of the user. The communication robot 1 performs reading aloud, for example, according to a state or a situation of the user (g17).

The communication robot 1 is also a multimodal robot communication platform using language and non-language channels in interactions with a person. The communication robot 1 is designed to clearly transfer information and to give depths and meanings using various signals of emotions.

In this embodiment, an agent of a remote operation system causes the communication robot 1 to learn responses of a software operator for learning responses from an operator.

<Example of Configuration of Remote Operation System>

An example of a configuration of a remote operation system will be described below.

Figure 2:
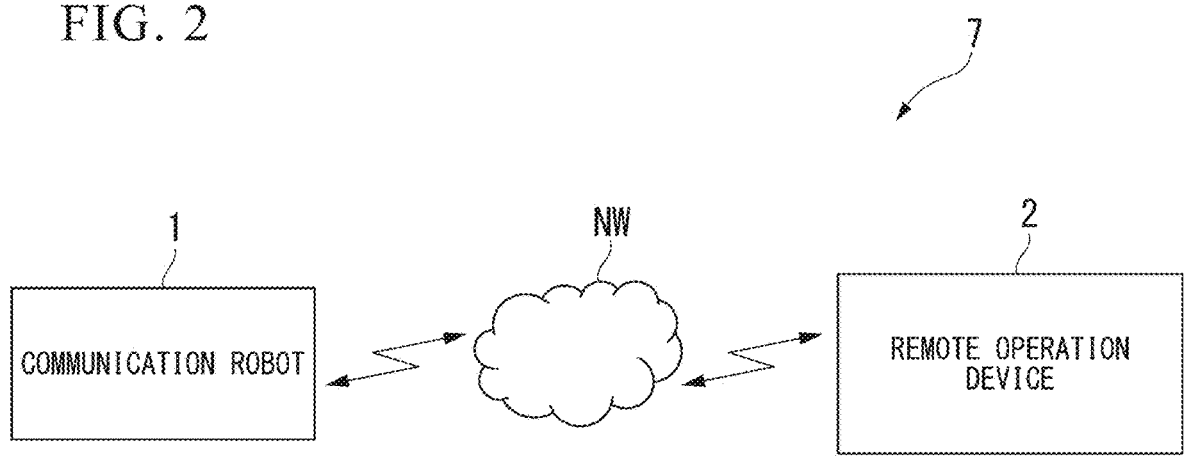
FIG. 2 is a diagram illustrating an example of a configuration of a remote operation system according to the embodiment.

FIG. 2 is a diagram illustrating an example of the configuration of the remote operation system according to this embodiment. As illustrated in FIG. 2, the remote operation system 7 includes a communication robot 1 and a remote operation device 2 (a learning device). The communication robot 1 and the remote operation device 2 are connected to each other via a network NW. The network NW is wired or wireless.

Examples of configurations of the communication robot 1 and the remote operation device 2 will be described later.

<Example of Appearance of Communication Robot>

An example of an appearance of the communication robot 1 will be described below.

Figure 3:
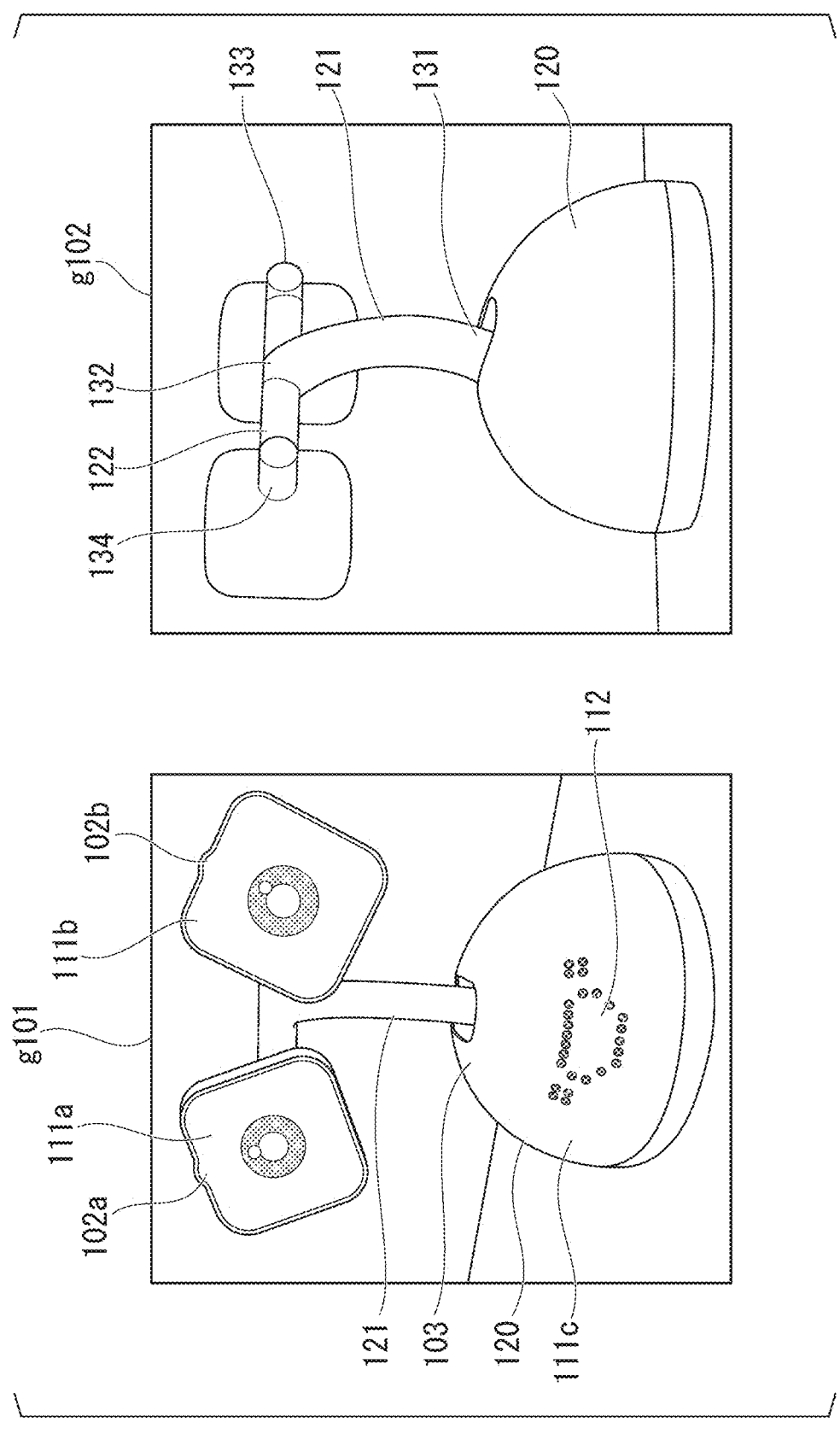
FIG. 3 is a diagram illustrating an example of an appearance of the communication robot according to the embodiment.

FIG. 3 is a diagram illustrating an example of an appearance of the communication robot according to this embodiment. In FIG. 3, a front view g101 and a side view g102 are diagrams illustrating an example of an appearance of the communication robot 1 according to this embodiment. The communication robot 1 includes three display units 111 (an eye display unit 111a, an eye display unit 111b, and a mouth display unit 111c). In the example illustrated in FIG. 3, an imaging unit 102a is attached to an upper part of the eye display unit 111a, and an imaging unit 102b is attached to an upper part of the eye display unit 111b. The eye display units 111a and 111b correspond to the eyes of a person and present an image or image information corresponding to the eyes of a person. The size of a screen of the eye display units 111a and 111b is, for example, 3 inches. A speaker 112 is attached to the vicinity of the mouth display unit 111c that displays an image corresponding to a human mouth of a housing 120. The mouth display unit 111c is constituted by, for example, a plurality of light emitting diodes (LEDs), and the LEDs can be designated by addresses and can be individually turned on and off. A sound collecting unit 103 is attached to the housing 120.

The communication robot 1 includes a boom 121. The boom 121 is attached to the housing 120 to be movable via a movable part 131. A horizontal bar 122 is attached to the boom 121 to be rotatable via a movable part 132.

The eye display unit 111a is attached to the horizontal bar 122 to be rotatable via a movable part 133, and the eye display unit 111b is attached to the horizontal bar 122 to be rotatable via a movable part 134. The appearance of the communication robot 1 illustrated in FIG. 3 is an example, and the present invention is not limited thereto.

Figure 4:
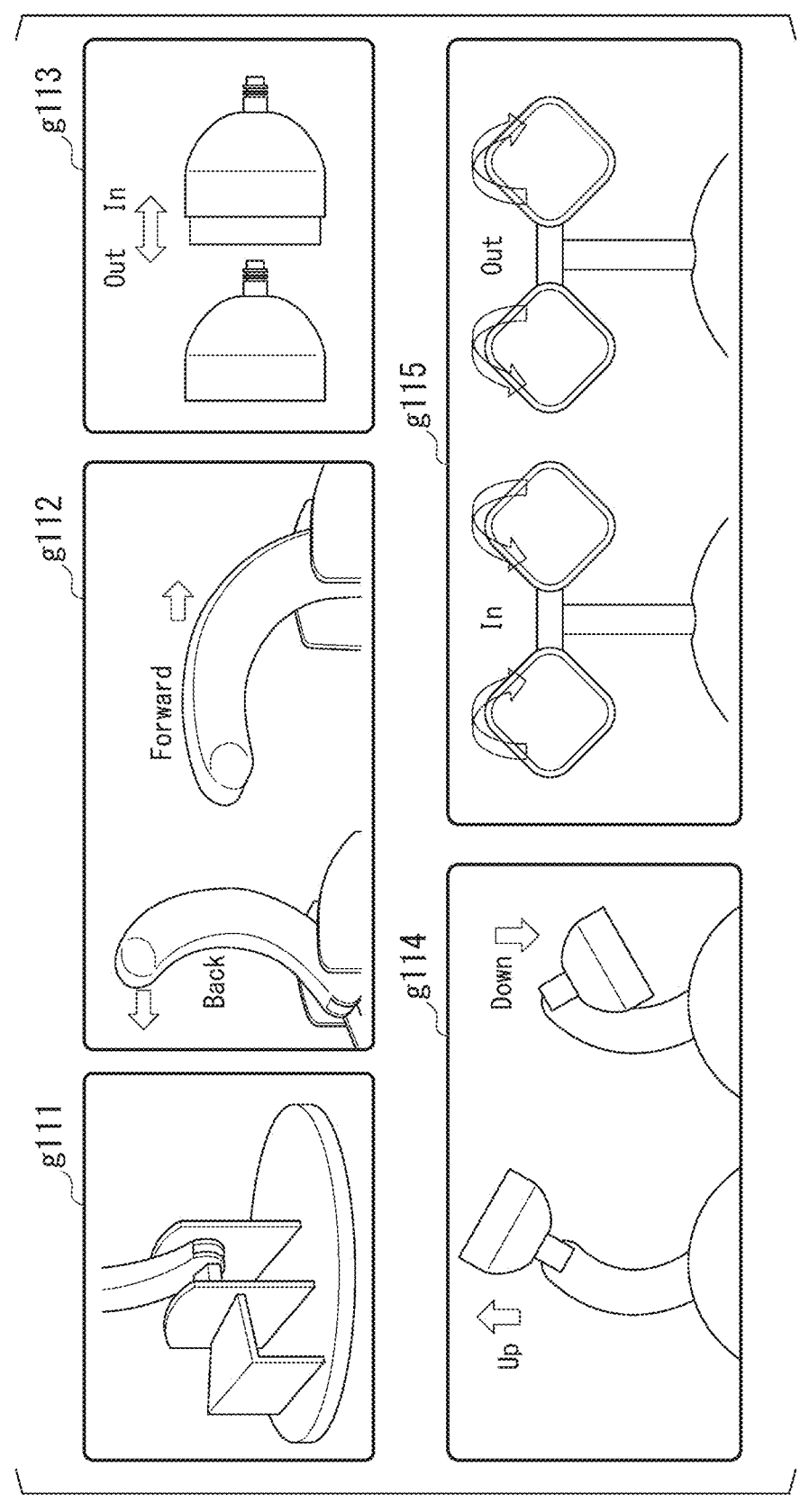
FIG. 4 is a diagram illustrating examples of modalities of the communication robot according to the embodiment.

FIG. 4 is a diagram illustrating examples of modalities of the communication robot according to this embodiment.

With the configuration illustrated in FIG. 3, the communication robot 1 has, for example, 5 degrees of freedom in motion (base rotation (g111), neck leaning (g112), eye stroke (g113), eye tilt (g114), and eye roll (g115)) to enable expressive motions as illustrated in FIG. 4.

These emotional routines have various impacts in view of a genre, a degree of niceness, and an intensity and are used for a remote operator to perform communication with a user in a remote location via the communication robot 1 without manually controlling individual modalities (for example, motors, LEDs, and sound).

<Example of Emotional Indication Routine of Communication Robot>

An example of an emotion indication routine of the communication robot 1 will be described below.

Figure 5:
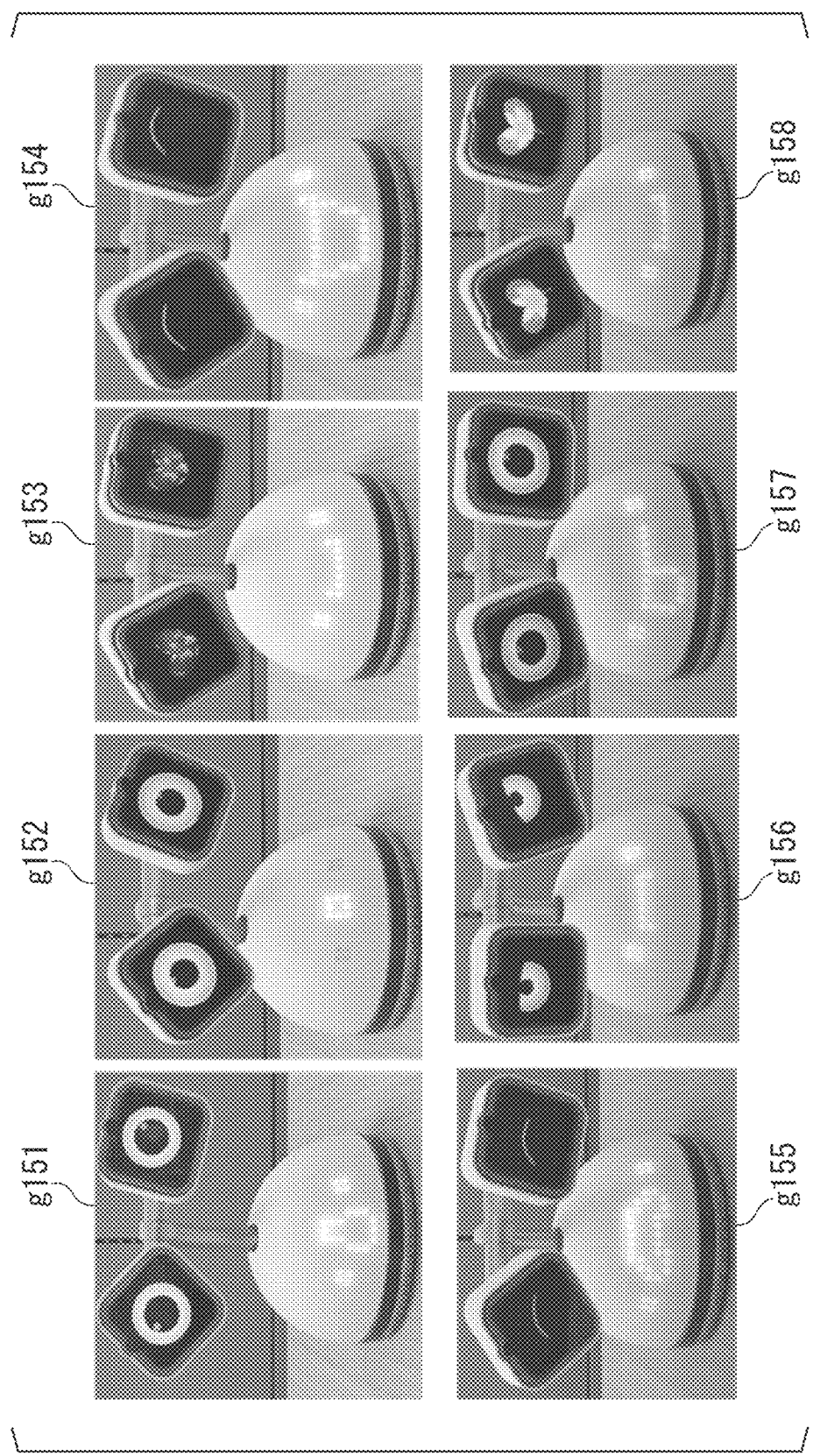
FIG. 5 is a diagram illustrating examples of emotional expression routines of the communication robot according to the embodiment.

FIG. 5 is a diagram illustrating examples of emotion indication routines of the communication robot according to this embodiment. Like images g151 to g158 illustrated in FIG. 5, the communication robot 1 indicates emotions such as surprise, approval, favor, disappoint, anger, interest, and happiness, for example, using the eye display unit 111a, the eye display unit 111b, the mouth display unit 111c, and the speaker 112. At the time of indication of an emotion, the communication robot 1 causes the eye display unit 111a, the eye display unit 111b, and the mouth display unit 111c to display an image and expresses, for example, movement of the eyes or movement of the face by controlling operations of the eye display unit 111a, the eye display unit 111b, and the boom 121.

The emotion indication routines illustrated in FIG. 5 are examples, and the present invention is not limited thereto.

<Example of Processing of Communication Robot 1>

An example of processing which is performed by the communication robot 1 in communication with a user will be described below.

The communication robot 1 recognizes a look of a user and a gesture of the user using a captured image. The communication robot 1 estimates an utterance intention of the user from a collected acoustic signal, for example, using a convolutional neural network (CNN) learning model which has been trained prior.

(Look Class, Gesture Class)

The communication robot 1 acquires a single image from internal camera data and recognizes a look to infer a human emotional state in the units of frames. For example, 7 look classes illustrated in FIG. 6 are recognized. FIG. 6 is a diagram illustrating examples of look classes and gesture classes which are recognized by the communication robot 1 according to this embodiment. The 7 look classes (a look recognition state) include, for example, anger, disgust, fear, happiness, sadness, surprise, and neutral as illustrated in FIG. 6.

The communication robot 1 recognizes a gesture expression (a gesture recognition state) by classifying segments having features in movement of joints into, for example, 17 gesture classes illustrated in FIG. 6. The 17 gesture classes include, for example, waving, bowing, photo, telephone, laughing, ashamed, be quiet, teasing, thinking, rejection, applauding, walking, standup, sit-down, sitting, and standing as illustrated in FIG. 6.

The look classes and the gesture classes illustrated in FIG. 6 are examples, and the present invention is not limited thereto.

The communication robot 1 tracks movement of the face or the body of a user from the user's gesture, for example, using a captured image, successively acquires, for example, 32 joints positions of the user, and divides a data stream into segments on the basis of characteristics of movement of a designated landmark joint. When a new trajectory of a series of joint positions is prepared, the communication robot 1 converts the trajectory to a feature set of angles and distances and rescales the acquired feature segments in standardized lengths using cubic interpolation.

The communication robot 1 finally evaluates the acquired "image of movement" using a CNN and acquires necessary class labels and predicted reliability information. The CNN has a very basic architecture which is identically used for relevant application scenarios.

(Estimation of Utterance Intention)

The communication robot 1 estimates an utterance intention, for example, using an utterance intention estimation module. The utterance intention estimation module is a package for learning estimation of utterance intentions, for example, using a speech processing module and a language understanding module. The communication robot 1 collects speech and maps the collected speech onto different estimated utterance intention classes. The communication robot 1 maps the speech onto, for example, a total of 15 estimated utterance intention classes. FIG. 7 is a diagram illustrating examples of estimated utterance intention classes according to this embodiment. The estimated utterance intention classes include, for example, an utterance about endearment (Endearment), a conversation about separation (Goodbye), a conversation about chattering (Smalltalk), a conversation about instruction (Directive), a conversation about disgust/rejection (Embitterment), a conversation about greeting (Greeting), and a conversion about weather (Weather). An example of the conversation about disgust/rejection (Embitterment) is "I hate you, You are annoying, . . . ."

<Example of Configuration of Remote Operation Device>

An example of a configuration of the remote operation device 2 will be described below.

Figure 8:
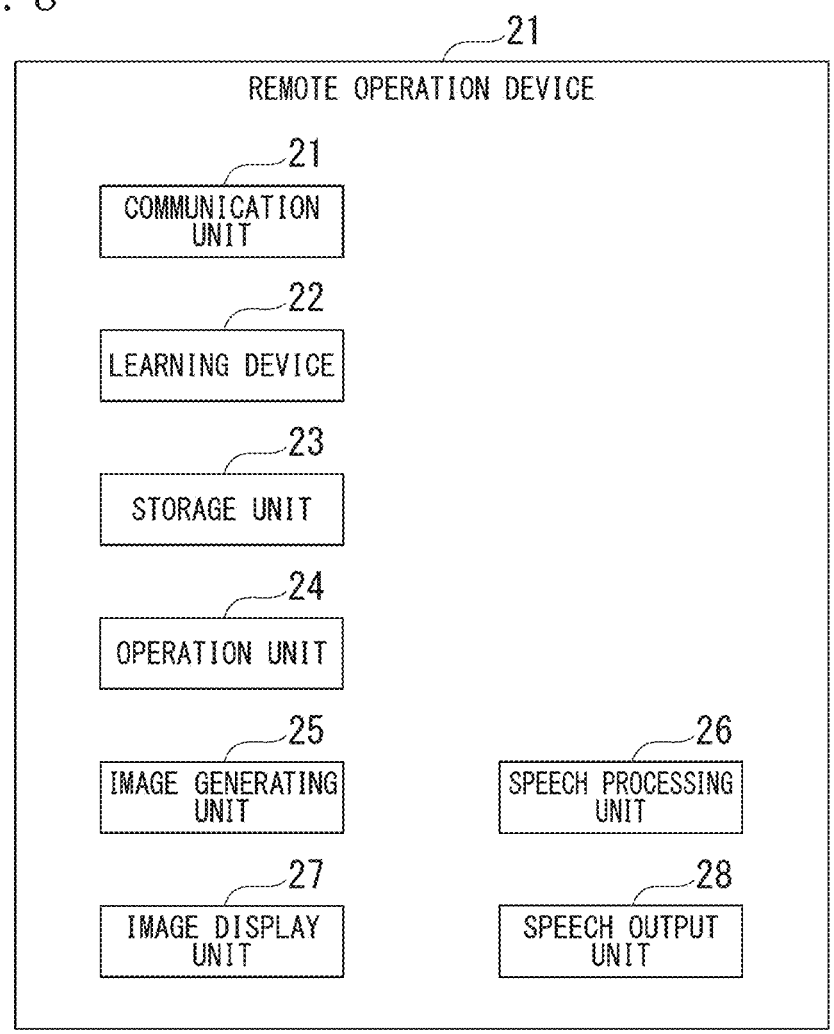
FIG. 8 is a diagram illustrating an example of a configuration of a remote operation device according to the embodiment.

FIG. 8 is a diagram illustrating an example of a configuration of the remote operation device according to this embodiment. As illustrated in FIG. 8, the remote operation device 2 includes a communication unit 21 (an acquisition unit), a learning device 22 (a learning unit), a storage unit 23, an operation unit 24 (an operation result acquiring unit), an image generating unit 25, an image display unit 26 (a presentation unit), a speech processing unit 27, and a speech output unit 28. The configuration of the remote operation device 2 illustrated in FIG. 8 is an example, and the present invention is not limited thereto.

The communication unit 21 acquires at least one of look information of the face of the user, gesture information of the user, and utterance intention information of the user which are transmitted from the communication robot 1. The communication unit 21 transmits a look image (an eye image, a mouth image, and movement of joints) generated by the remote operation device 2 to the communication robot 1. The communication unit 21 transmits speech signal generated by the remote operation device 2 to the communication robot 1.

The learning device 22 learns optimal actions using recognition results of perception modalities acquired from a perception suite as an input of a learning system. A processing method of the learning device 22 or the like will be described later. The communication robot 1 may include a trained learning device 22 or a model which is generated by training the learning device 22.

The storage unit 23 stores a sound source model required for speech processing and a program, an initial value, a threshold value, and the like used by the remote operation device 2. The storage unit 23 temporarily stores information received from the communication robot 1.

The operation unit 24 detects an operation result performed by a remote operator. The operation unit 24 is, for example, a touch panel sensor provided on the image display unit 26, a mouse, or a keyboard.

The image generating unit 25 prepares an image of a setting screen illustrated in FIG. 9 which will be described later and a look image (an eye image, a mouth image, and movement of joints) of the communication robot 1 by simulation using the learning device 22.

The image display unit 26 provides the image of a setting screen illustrated in FIG. 9 which will be described later and the look image of the communication robot 1 simulated by the learning device 22 to the remote operator.

The speech processing unit 27 prepares uttered speech of the communication robot 1 by simulation using the learning device 22.

The speech output unit 28 emits a speech signal simulated by the learning device 22. The speech output unit 28 is, for example, a speaker.

<Example of Interface for Remote Operation>

An example of an interface for remote operation will be described below.

Figure 9:
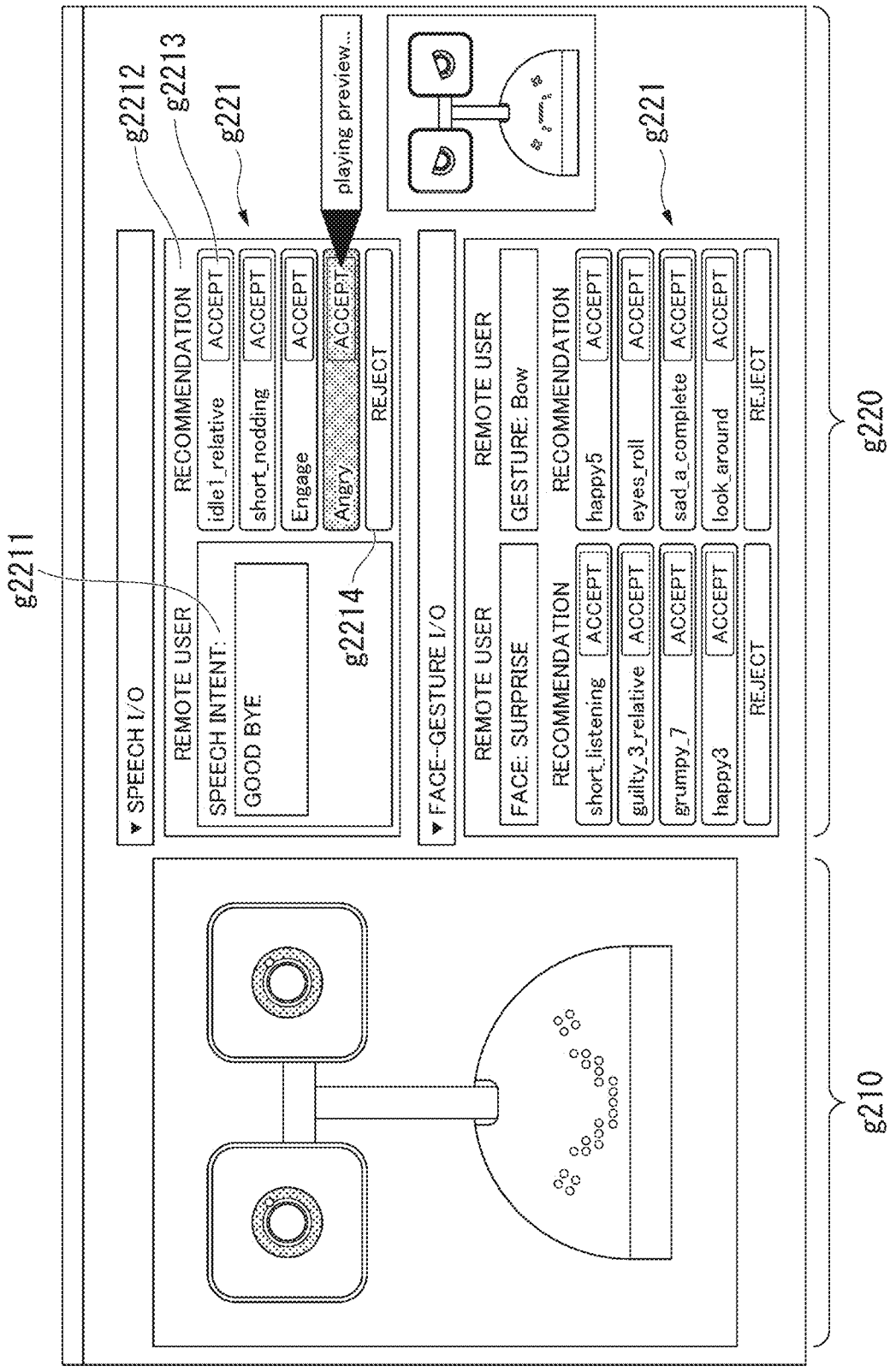
FIG. 9 is a diagram illustrating an example of an interface of a remote operation according to the embodiment.

FIG. 9 is a diagram illustrating an example of an interface for remote operation according to this embodiment. The image illustrated in FIG. 9 is displayed on the image display unit 26. The interface of the remote operation device 2 includes two principal components.

A first component is a panel including a robot simulator indicating hardware of a robot located at a remote place from the remote operation device 2 (g210). This panel reflects operations of both hardware (remote) and the simulated robot.

A second component is a remote operation panel (g220). The robot simulator is mounted, for example, as ROS Gazebo simulator. The remote operation panel uses, for example, a Qt-5 system and an ROS for a desktop application as a backend. The remote operation panel is designed in consideration of a learning mechanism. This interface provides communication between the remote operator and a learning module.

The remote operation panel includes, for example, 3 widgets corresponding to 3 modalities. The 3 widgets include three widgets such as a speech (utterance intention estimation) I/O (g221), a face (look) I/O, and a gesture I/O (g222). The remote operation panel receives text-based labels from a recognition unit 105 (a perception module) (see FIG. 18) of the communication robot 1. These labels correspond to a speech-based intention and an expression of a face or a gesture which are sent from the robot to the remote operator.

It is preferable that the remote operation system 7 do not transmit raw audio/visual data in view of privacy protection. When the raw audio/visual data is not received by the remote operation device 2, the remote operator depends on only the labels of three modalities. These labels are displayed in corresponding fields such as "FACE," "GESTURE," and "SPEECH INTENT" (for example, an image g2221).

When the remote operation device 2 receives this data, the learning device 22 generates four recommended sets (action sets) of routines with a highest likelihood of an "appropriate" response. These recommendations are displayed, for example, in corresponding slots of central and lower widgets with a label "RECOMMENDATIONS" (for example, an image g2212) for each modality.

The remote operator may not select any modality when the remote operator determines that the recommendations are not appropriate.

When an ACCEPT button image g2213 is pushed (selected), the remote operation device 2 sends a positive feedback to the learning device 22. Similarly, when a REJECT button image g2214 is pushed (selected), the learning device 22 receives a negative feedback. The remote operator selects each button image on an interface image displayed on the image display unit 26 by operating the operation unit 24. The remote operation device 2 may provide information such that the remote operator reads a preview of recommended routines when the remote operator has questions.

The image of the screen illustrated in FIG. 9 is an example and the present invention is not limited thereto.

<Learning Method of Learning Device 22>

An example of a learning method and a processing sequence of the learning device 22 will be described below.

Figure 10:
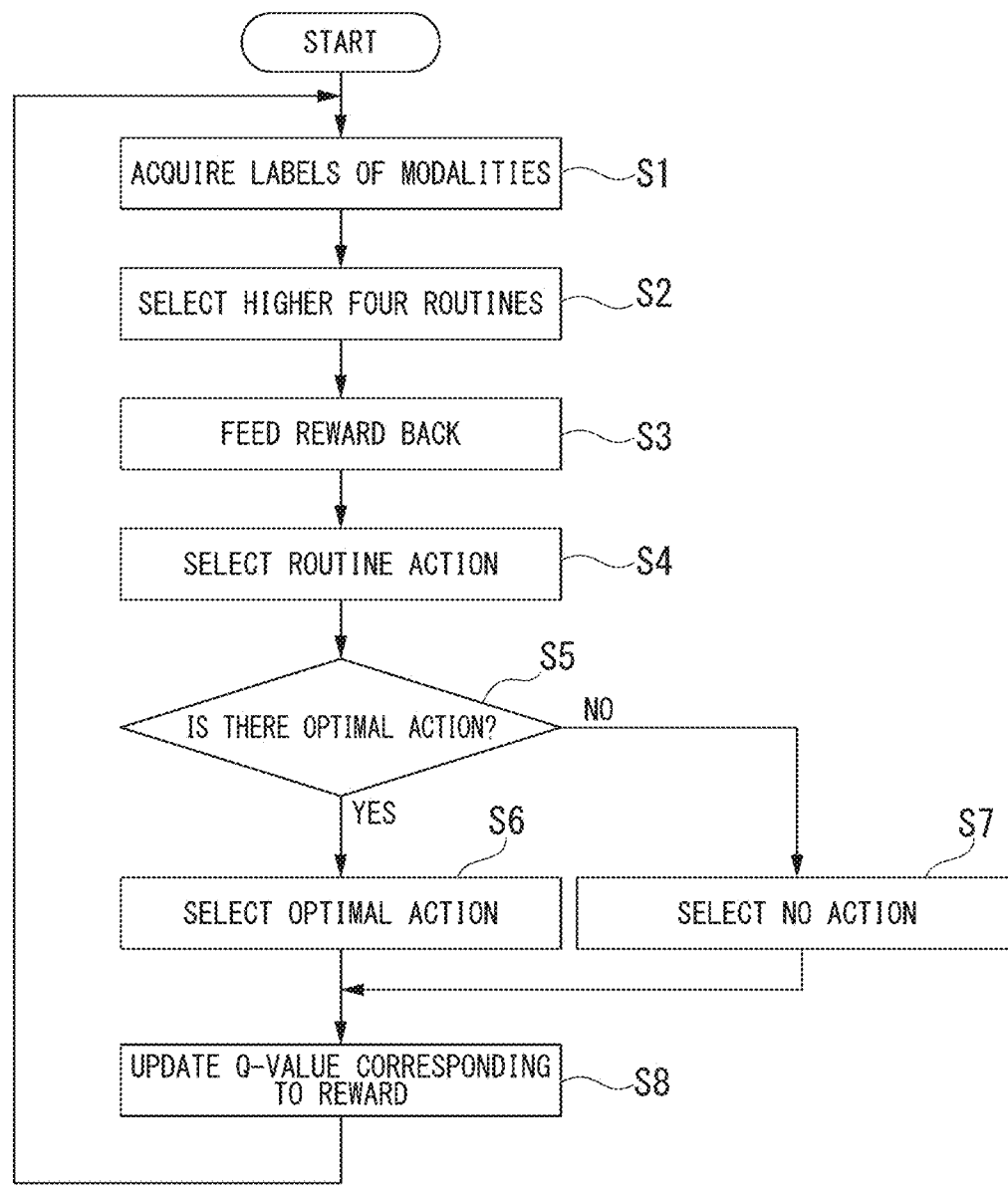
FIG. 10 is a flowchart illustrating an example of a process flow which is performed by a learning device according to the embodiment.

FIG. 10 is a flowchart illustrating an example of a processing sequence of the learning device according to this embodiment.

The learning device 22 performs, for example autonomous action recommendation learning using reinforcement learning. In this case, the remote operator gives an evaluative feedback instead of personally selecting a corresponding action. Accordingly, the learning device 22 trains an agent to select and perform routine actions for the three modalities.

When mapping from raw input modalities onto actions of optimal routines is learned using a deep reinforcement learning method, it takes long time to learn features of input modalities indicating a human user state before effectively learn recommendation of optimal actions.

Accordingly, in this embodiment, learning of optimal actions is advanced using a recognition result of perception modalities acquired from a perception suite as an input of a learning system.

Q-learning (see Citation 1) which is a representative method of reinforcement learning is used as an algorithm used in the learning method of the learning device 22. In this embodiment, a reward is not provided using a predefined reward function such as Q-learning of reinforcement learning in the related art, but is provided by a remote operator via a graphical user interface (GUI) as illustrated in FIG. 9.

Citation 1: C. J. Watkins and P. Dayan, "Q-learning", Machine learning, vol. 8, no. 3-4, pp. 279-292, 1992

A learning mechanism is mainly human-centered reinforcement learning or human-in-the-loop reinforcement learning. The learning device 22 receives labels (classes) of modalities generated by the recognition unit 105 (a perception module) of the communication robot 1 (Step S1).

Then, the learning device 22 selects four routine sets by selecting four routines with highest Q-values from vocabulary of the routines as performed in Q-learning in the related art (Step S2). The number of routines to be selected is not limited to four, but may be 3 or less or 5 or more.

The selected set is sent to the GUI of the remote operation panel, and a feedback of the remote operator in response to four recommended routine actions is returned as a reward selected by a user to the learning device 22. Specifically, first, the learning device 22 detects a current state $s_t$ of a user who has a conversation with the communication robot 1 at time t.

Then, the learning device 22 selects four routine actions with highest Q-values in the state $s_t$ (Step S4). The learning device 22 randomly selects, for example, actions with the same Q-value. In the initial time, Q-values of all actions in all states are initialized to 0. Accordingly, the learning device 22 can randomly select four actions out of the vocabulary.

The learning device 22 sends the selected action set to the GUI of the remote operation panel and checks whether there is an optimal action in the state $s_t$ (Step S5). When there is at least one optimal action, the learning device 22 selects it (Step S6). When there is no optimal action, the learning device 22 does not select any action (Step S7).

The learning device 22 receives a feedback as a reward $R_h$ selected by allowing a user to operate the operation unit 24 and updates the corresponding Q-value (Step S8). As expressed by Expression (1), the reward $R_h$ is +10 for the selected optimal action, −0.5 for the other three non-selected actions, and −1 for the four actions when none thereof are selected. That is, the learning device 22 gives a first reward (for example, +10) for the selected action, gives a negative second reward (for example, −0.5) to the other non-selected actions of the set of a plurality of actions, and gives a negative third reward (for example, −1) greater than the second reward when none are selected from the set of a plurality of actions. The values of the reward are examples, and the present invention is not limited thereto.

[Math. 4]
$$R_h = \begin{cases} +10 & \text{selecting right routine behavior} \\ -0.5 & \text{other three } \textit{unselecred} \text{ routine behaviors} \\ -1 & \text{no right routine behavior selected} \end{cases} \quad (1)$$

The learning device 22 uses the reward $R_h$ to calculate a time difference error $\delta_t$ as expressed by Expression (2). In Expression (2), $\gamma$ is a discount factor, s' is a next state of the user, a is an action with a maximum Q-value with respect to s', $a_i$ is an i-th action which is selected by the communication robot 1 and which is transmitted to the remote operator, and Q(•) is a Q value in Q-learning.

[Math. 5]
$$\delta_t = R_h + \gamma \max_a Q(s', a) - Q(s_t, a_i) \quad (2)$$

As expressed by Expression (3), the learning device 22 uses the time difference error $\delta_t$ to update the Q-values of four routine actions recommended in the state $s_t$. $Q(s_t, a_i)$ is the Q-value of the i-th action which is selected and transmitted to the remote operator (user) by the communication robot 1 in the state $s_t$, and a is a learning rate.

[Math. 6]
$$Q(s_t, a_i) = Q(s_t, a_i) + \alpha \delta_t \quad (3)$$

Then, the learning device 22 returns the process flow to Step S1 and selects four different routine actions with highest Q-values for recommendation when a new state $s_{t+1}$ is detected at time t+1 by Expression (4)

[Math. 7]
$$a \leftarrow \mathrm{argmax}_a Q(s_{t+1}, a_i) \quad (4)$$

Then, the learning device 22 starts a new cycle of recommending four daily action routines, selecting an appropriate action from the GUI or transmitting a feedback without selecting any action when there is no optimal action, and updating the corresponding Q-value.

The learning device 22 performs learning until optimal routine actions for all states of the modalities can be estimated while receiving a feedback from the remote operator.

The process flow or the algorithm described above with reference to FIG. 10 is an example, and the present invention is not limited thereto.

<Example of Communication Between Communication Robot 1 and User>

An example of communication between the communication robot 1 and a user using information learned by the learning device 22 will be described below.

Figures 11, 12:
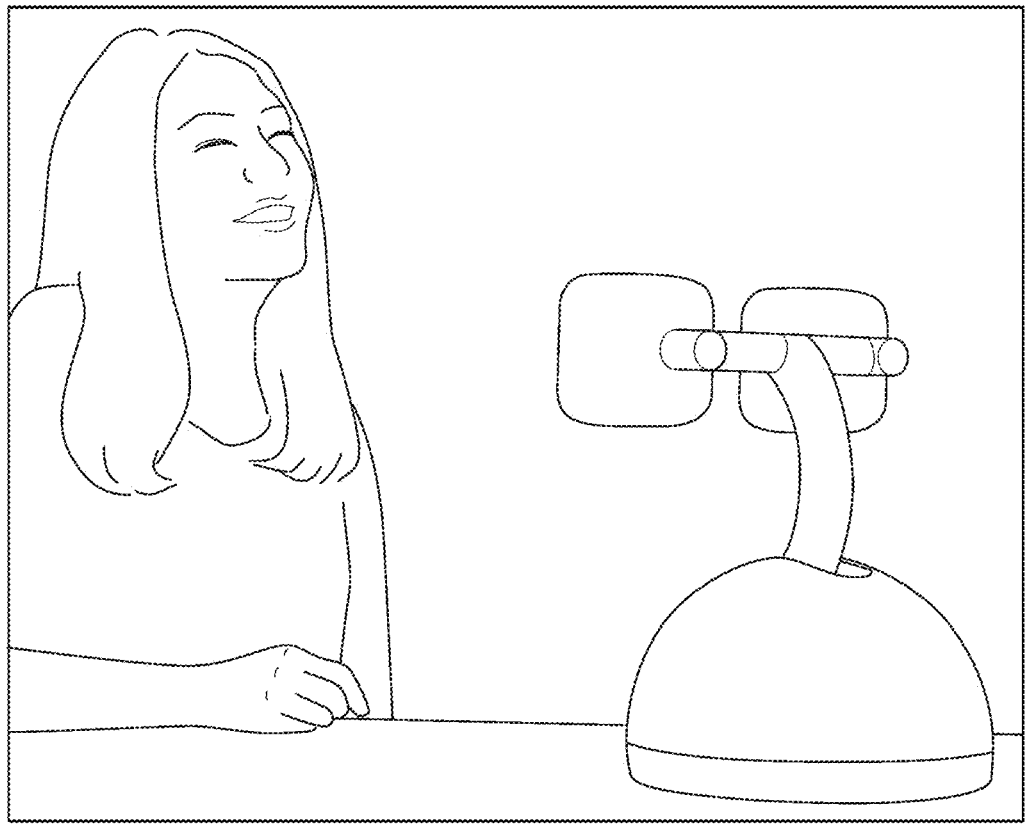
FIG. 11 is a diagram illustrating an example of communication between the communication robot according to the embodiment and a user.
FIG. 12 is a diagram illustrating an example of the number of interactions for learning routine motions optimal for each state of a speech modality.

FIG. 11 is a diagram illustrating an example of communication between the communication robot 1 and a user according to this embodiment. In the example illustrated in FIG. 11, a user gives a talk to the communication robot 1 at the time of going home and communication between the user and the communication robot 1 is performed. In the communication, the communication robot 1 acts (performs utterance, movement, presentation of an image) such that a good relationship with a person is kept. The communication robot 1 controls a gesture or an action by driving the boom, the horizontal bar, and the like using a drive unit 1103 and actuators 113.

<Evaluation>

An evaluation result of the remote operation system 7 will be described below.

First, evaluation conditions will be described.

In evaluation, for the purpose of simplification, the number of utterance intention classes recognized by the communication robot 1 (a speech recognition state) is set to 5, the number of gesture classes is set to 5, and the number of emotion classes is set to 7. The 5 utterance intention classes include Greeting (greeting), Goodbye (a conversation about separation), Endearment (a conversation about endearment), Embitterment (disgust/rejection), and Directive (instruction). The 5 gesture classes include Waving (hand waving), Bow (return/nod), Sssh (be quiet), Ashamed (shame), and Laughing (laugh). The 7 emotion classes include Neutral (natural/normal), Happiness (happiness), Surprise (surprise), Sadness, Anger (anger), Disgust (disgust), and Contempt (contempt).

The number of stereotyped actions included in the vocabulary corresponding to states of three modalities is, for example, 32.

In evaluation, an agent of three modalities of emotion, speech, and gesture is trained 7 times by causing the remote operator to give a feedback. In each trial, the learning device 22 starts learning by receiving the states detected in the modalities and selects four actions according to a model with an initialized Q-value. Then, the remote operator ascertains a recommended action list via the remote operation GUI and gives a feedback to the learning device 22. The learning device 22 updates the model with the received feedback. Thereafter, the learning device 22 starts a new cycle and performs learning when a new state is detected from the modalities. The remote operator trains the agent until the learning device 22 can estimate optimal actions for all the states detected in the modalities.

In evaluation, an evaluator counts the number of interactions required for the learning device 22 to recommend optimal routine actions in the list displayed on the remote operation GUI in the states of all the modalities.

For comparison of evaluation results, the method according to this embodiment is compared with a system according to the related art using clustering of routines mapped onto the recognized modalities and a system (Naïve) performing random selection. In evaluation, Results of operation of the remote operation device 2 by 30 adult remote operators were evaluated. In evaluation, the purpose of study was explained in advance to participants, and responses (ACCEPT, REJECT, response time, and the like) of the participants were recorded.

Evaluation results will be described below.

FIG. 12 is a diagram illustrating an example of the number of interactions for learning optimal routine operations for the states of the speech modality. FIG. 13 is a diagram illustrating an example of the number of interactions for learning optimal routine operations for the states of the gesture modality. FIG. 14 is a diagram illustrating an example of the number of interactions for learning optimal routine operations for the states of the emotion modality.

It can be seen from FIGS. 12 to 14 that 20 conversations in average, about 24 conversations, are required until the learning device 22 can estimate routine actions optimal for the remote operator.

In order to recommend optimal actions for all the states of speech or gesture, it is necessary to perform 14 interactions.

In the most states of speech or gesture, 10 or more interactions are required for learning optimal actions, and 20 or more or 30 or more interactions are required for only one or two states.

The learning device 22 has estimated an optimal action through a first interaction. In this case, an optimal policy is learned through only one interaction.

In the speech modality and the gesture modality in which the numbers of states are the same, the numbers of interactions required for learning an optimal policy are almost the same.

On the other hand, when the number of states increases to 7 like the emotion modality, the number of interactions required for learning estimation of optimal routine actions increases (39.14 interactions in average).

However, as illustrated in FIG. 14, in some states of each trial, the number of required interactions is 20 more or less, and the number of states requiring more interactions is only 1 or 2, which is the same as in the speech or gesture modality.

FIGS. 15 to 18 are diagrams illustrating an example of a heat map in which learned Q-values of the routine actions are visualized in all the states in the course of learning. The number of interactions is 1 for the speech modality in FIG. 15, 5 for the speech modality in FIG. 16, 10 for the speech modality in FIG. 17, and 16 for the speech modality in FIG. 18. In FIGS. 15 to 18, the horizontal axis represents 5 state-speech intents, and the vertical axis represents 32 daily actions which are selected to estimate the routines. In FIGS. 15 to 18, each block indicates one Q-value corresponding to one routine action in each state. In FIGS. 15 to 18, the Q-values are normalized in the same scales for the purpose of easy comparison. In FIGS. 15 to 18, a darker color of each block indicates the larger Q-value.

As described above, 4 routine actions with highest Q-values (four darker blocks) are estimated by the learning device 22.

Figure 15:
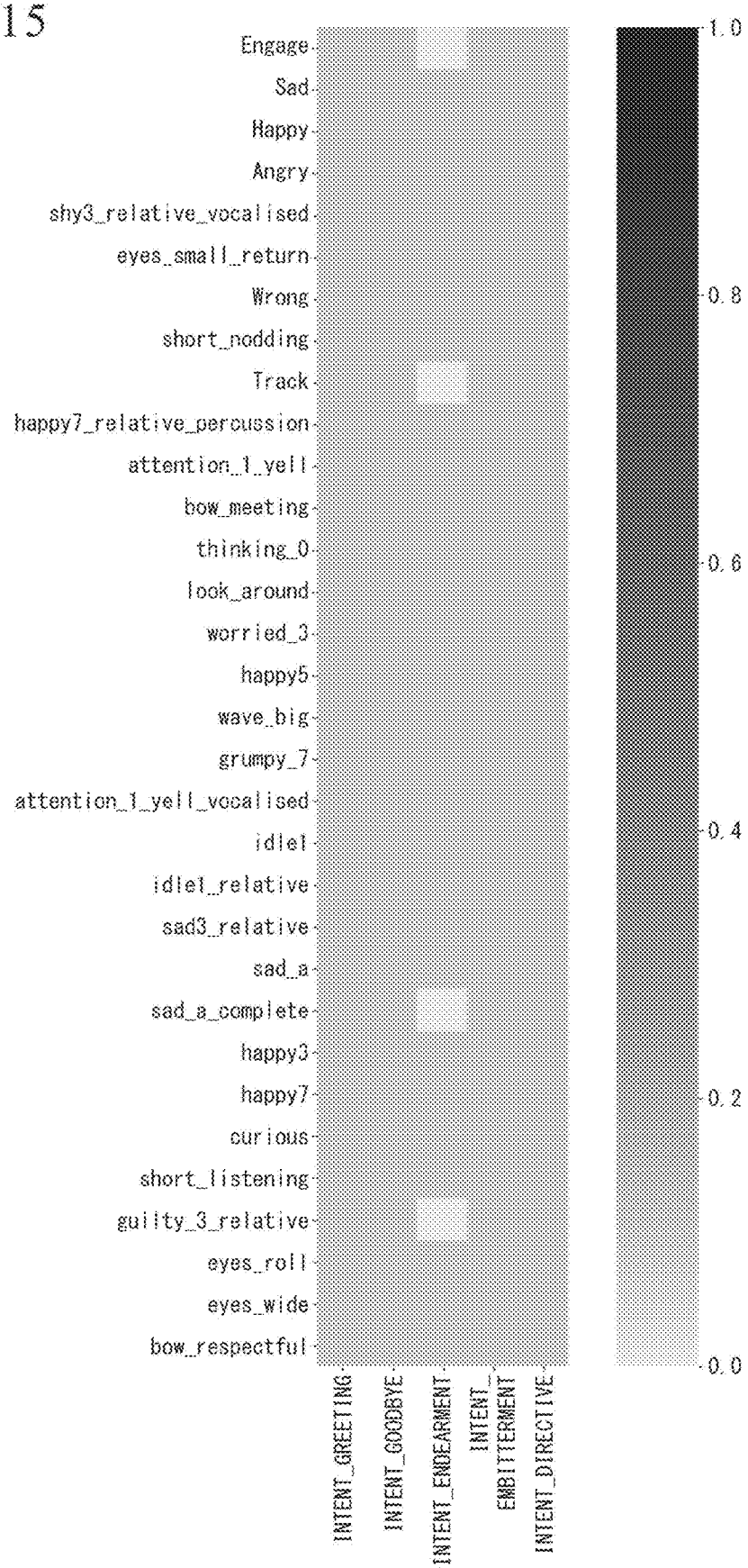
FIG. 15 is a diagram illustrating an example of a heat map in which learned Q values of routine motions are visualized in all statuses of the course of learning.

As illustrated in FIG. 15, it can be seen that there is no optimal routine action in four first estimated actions. As illustrated in FIG. 15, after a feedback has been received from the remote operator, the Q-values of four recommended actions are smaller than those of other actions in that state (a light colored part). That is, until an optimal action is found and selected out of four actions estimated by the learning device 22, these four actions are not estimated even when the same state as in the new cycle is detected by the agent. As a result, the Q-value for the optimal action increases as illustrated in FIG. 14 (a dark color).

Figure 16:
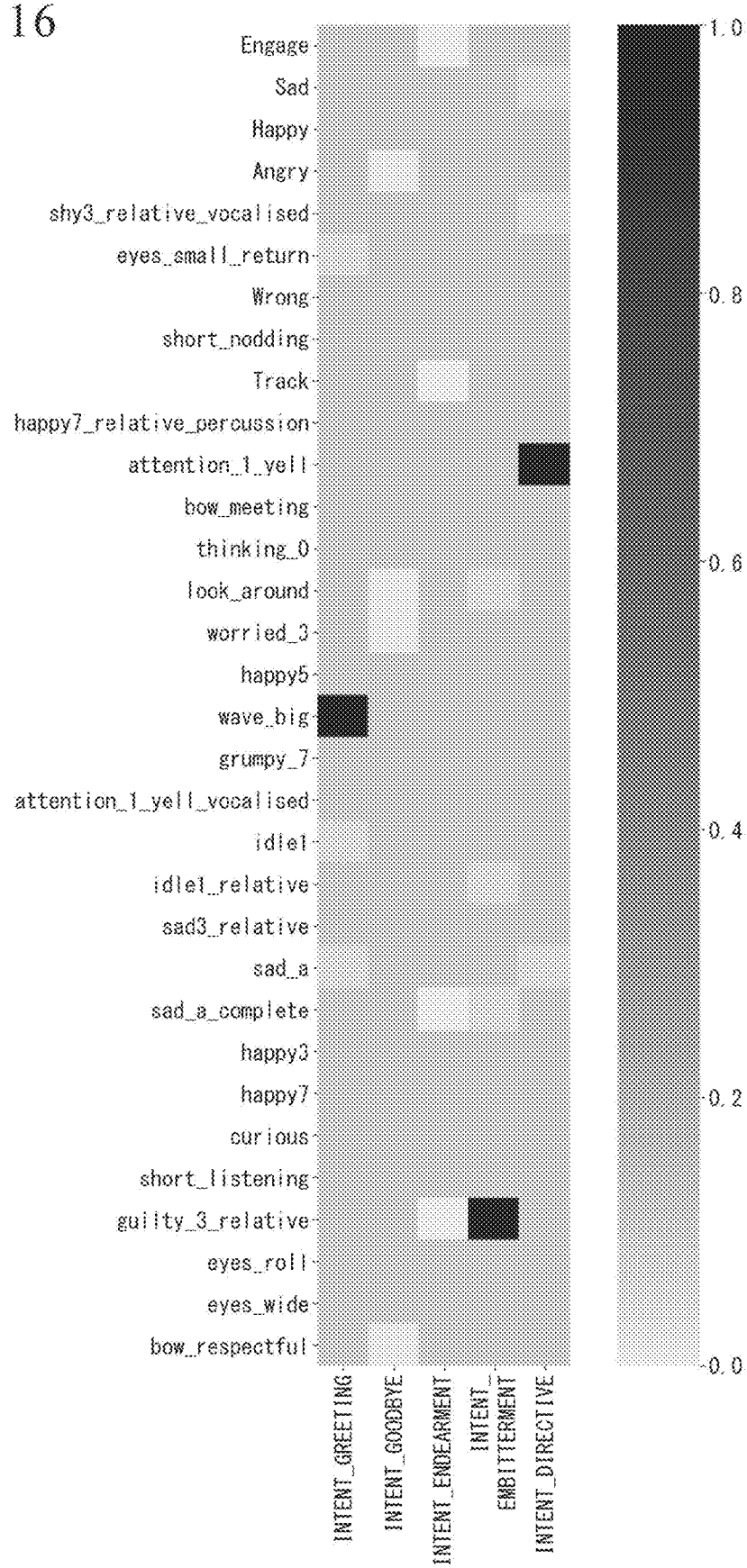
FIG. 16 is a diagram illustrating an example of a heat map in which learned Q values of routine motions are visualized in all statuses of the course of learning.

As illustrated in FIG. 16, after 5 interactions, that is, 5 feedbacks, have been received from the remote operator, the learning device 22 has learned the optimal actions for three states already (three black blocks).

Figure 17:
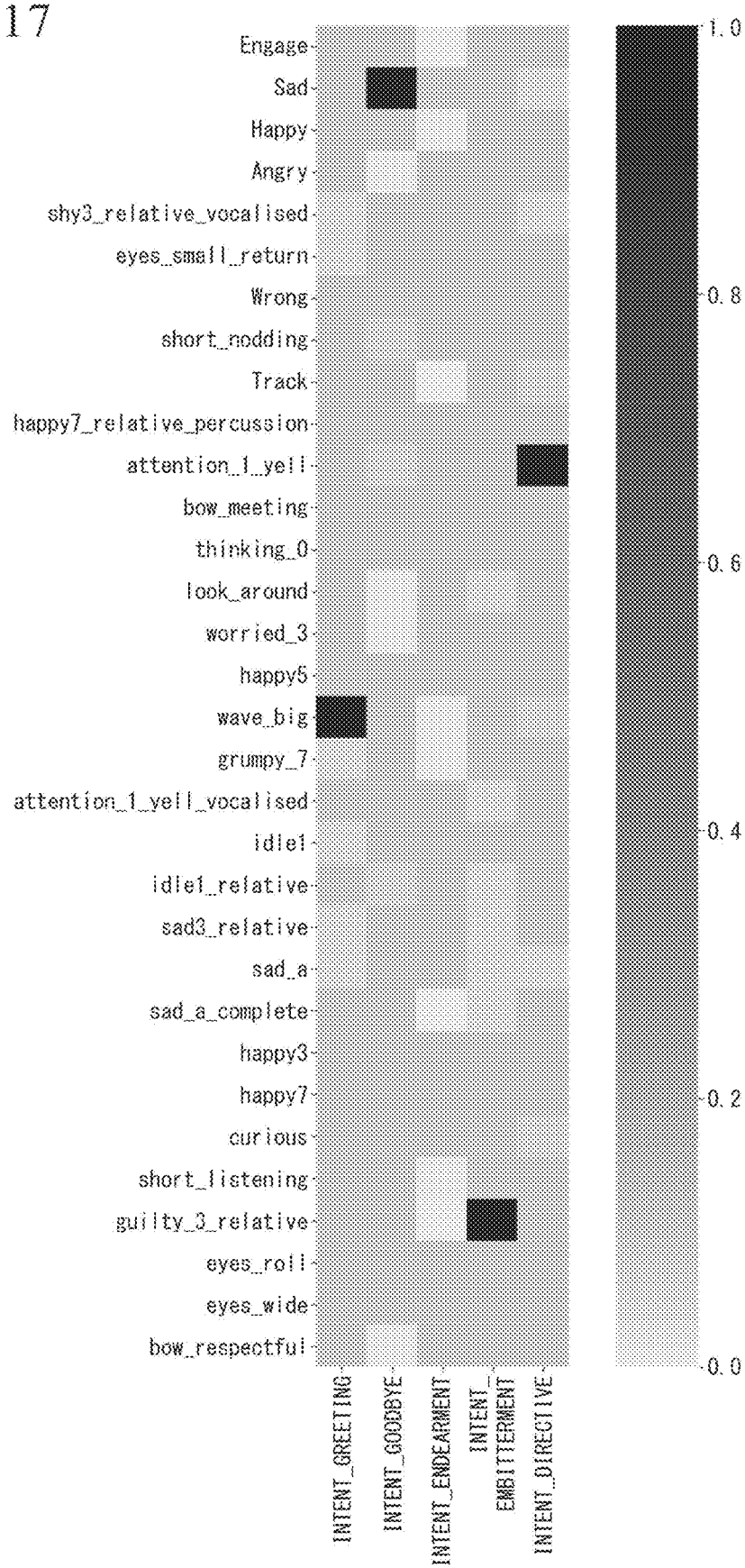
FIG. 17 is a diagram illustrating an example of a heat map in which learned Q values of routine motions are visualized in all statuses of the course of learning.
Figure 18:
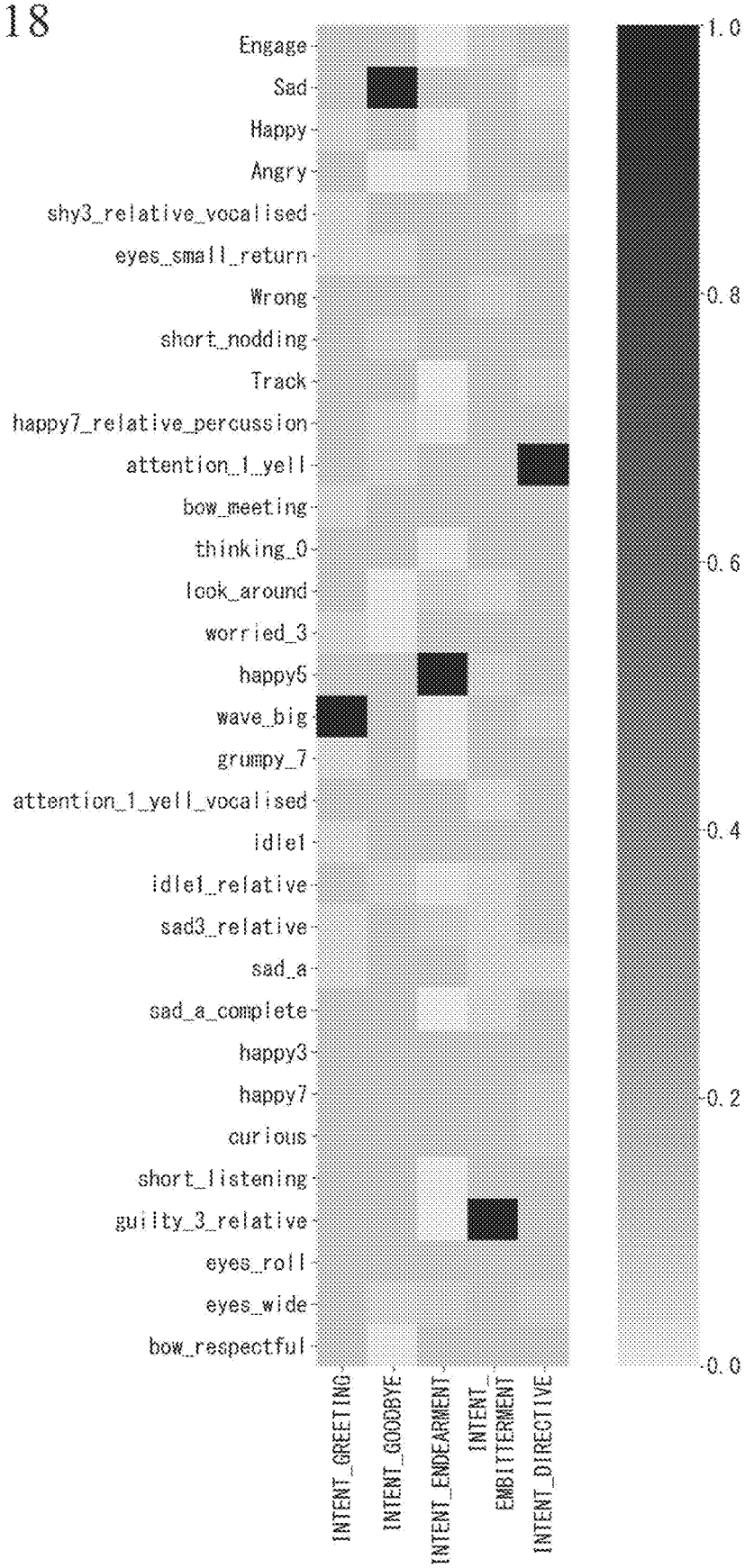
FIG. 18 is a diagram illustrating an example of a heat map in which learned Q values of routine motions are visualized in all statuses of the course of learning.

As illustrated in FIG. 17, the optimal actions for four states have been learned through 10 interactions. As illustrated in FIG. 18, all the optimal actions of five states have been learned through 16 interactions.

Figure 19:
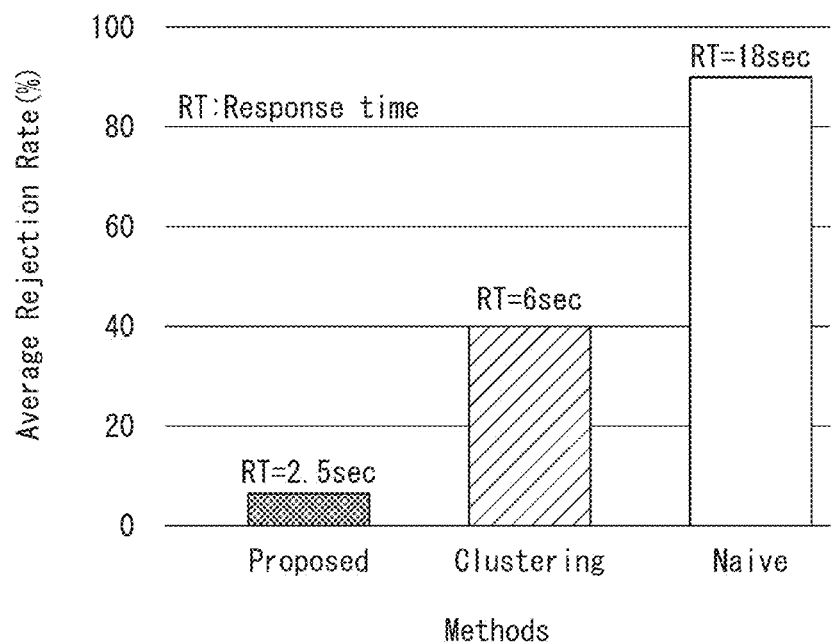
FIG. 19 is a diagram illustrating an example of an evaluation result.

FIG. 19 is a diagram illustrating an example of the evaluation results. In FIG. 19, the horizontal axis represents method items, and the vertical axis represents (normalized) results (%) obtained by collecting the total number of accepted routines and rejected routines from a log of the system. In FIG. 19, the method according to this embodiment and results of examination of an average response time in two comparative examples are illustrated together.

As illustrated in FIG. 19, it can be seen that the method according to this embodiment is more excellent than the clustering method according to the related art or a naïve system with fewer rejected responses. It can be seen that a response time (RT) in the method according to this embodiment is more excellent in the other two methods. This is because the remote operator does not have to scroll and search for an appropriate routine and the agent estimates an optimal routine.

When the communication robot 1 is operated from a remote location, the remote operator has to respond to, for example, three modalities of a face look, a body gesture, and intention indication based on speech of a user near the communication robot 1.

In this embodiment, audio/visual data of the user remotely located is not provided to the remote operator and only a recognition result from the recognition module is provided in the remote operation. Accordingly, according to this embodiment, it is possible to protect privacy of the user.

In this embodiment, the communication robot 1 performs recognition and classifies the recognition results in view of privacy, but the present invention is not limited thereto. In some usage conditions or applications, at the time of learning, the communication robot 1 may transmit acquired image data or speech data to the remote operation device 2, and the remote operation device 2 may perform image processing, a speech recognizing process, or classification.

As described above, according to this embodiment, an optimal option for appropriately returning an action response of a robot can be selected by employing the remote operation system 7 using the learning device 22 which has been trained to perform estimation through automatic routine selection.

In this embodiment, instead of causing the remote operator to select a routine from a pool of routines (routine vocabulary), a sub set of optimal routines is generated through recommendation of the agent of the learning device 22 as described above.

In this embodiment, the agent of the remote operation system is software for learning responses of an operator and can provide software for learning responses of an operator.

By using such learning results, it is possible to enable enhancement in efficiency of the remote operator of the communication robot 1 and to enable semi-automation of the remote operation system 7.

According to this embodiment, by causing the remote operator to perform a smaller number of interactions, the system can perform learning to recommend optimal routine motions for all the recognized modalities and it is possible to greatly reduce a work load of the remote operator.

As described above, the communication robot 1 can indicate emotions using various methods by performing emotional routines. According to this embodiment, an emotion of the remote operator located at a place remote from the communication robot 1 can be transmitted to the communication robot 1. Accordingly, according to this embodiment, User A located near the communication robot 1 and User B located in a place remote from the communication robot 1 can communicate with each other via the communication robot 1.

A motion of the communication robot 1 is expressed by a series of actuators. A look of the communication robot 1 is expressed using the eye display unit 111a and the eye display unit 111b corresponding to human eyes and the mouth display unit 111c corresponding to a human mouth. Speech of the communication robot 1 is emitted from the speaker 112. The communication robot 1 includes the imaging unit 102, the sound collecting unit 103, and the recognition unit 105 to acquire and recognize audio/visual data of a user near the communication robot 1.

<Example of Configuration of Communication Robot 1>

An example of a configuration of the communication robot 1 will be described below.

Figure 20:
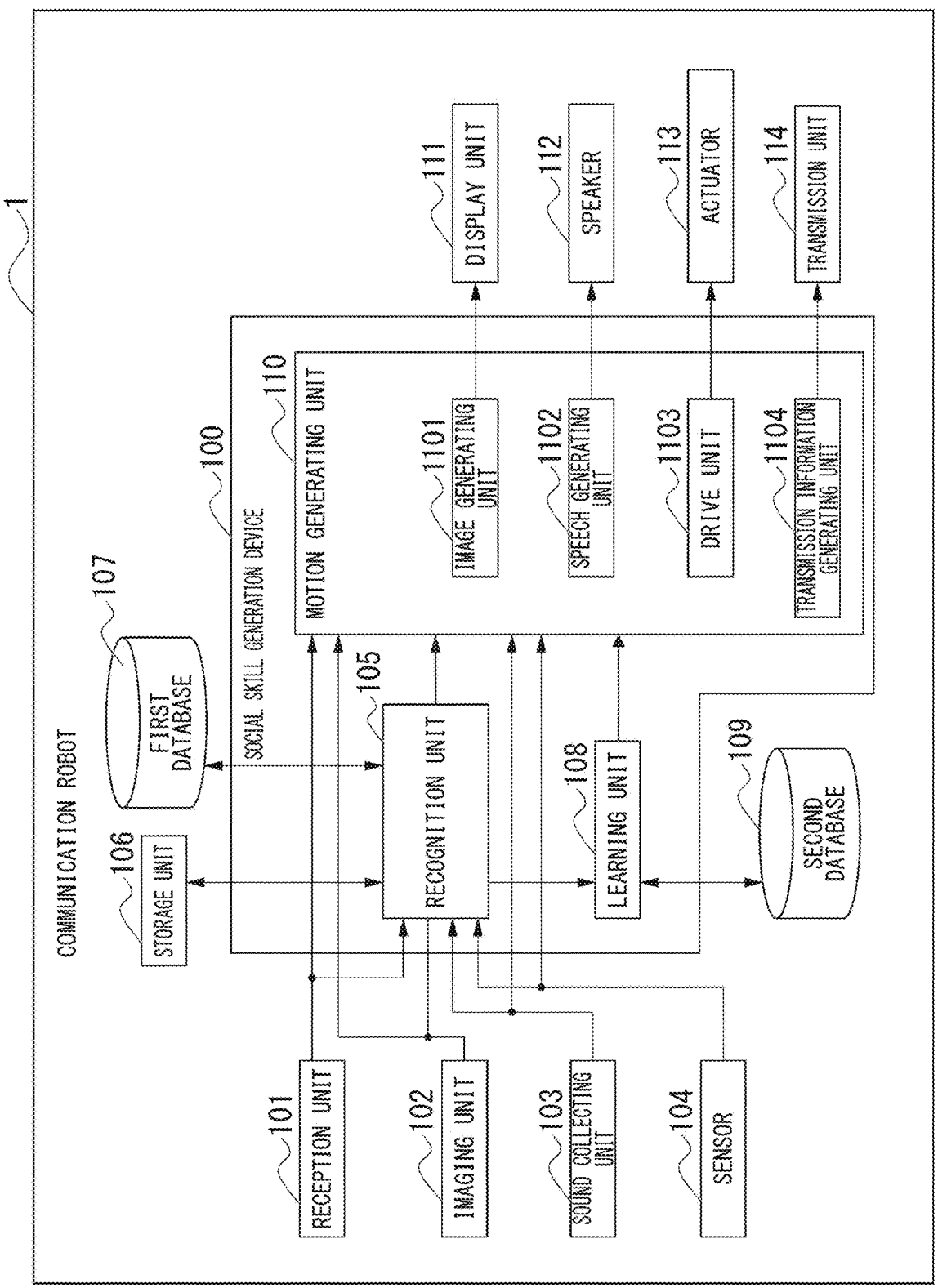
FIG. 20 is a block diagram illustrating an example of a configuration of the communication robot according to the embodiment.

FIG. 20 is a block diagram illustrating an example of the configuration of the communication robot according to this embodiment. As illustrated in FIG. 20, the communication robot 1 includes a reception unit 101, an imaging unit 102, a sound collecting unit 103, a sensor 104, a social skill generation device 100, a storage unit 106, a first database 107, a second database 109, a display unit 111, a speaker 112, an actuator 113, and a transmission unit 114.

The social skill generation device 100 includes a recognition unit 105 (a recognition device), a learning unit 108 (a learning device), and a motion generating unit 110 (a motion generating device).

The motion generating unit 110 includes an image generating unit 1101, a speech generating unit 1102, a drive unit 1103, and a transmission information generating unit 1104.

<Functions and Operations of Communication Robot 1>

Functions and operations of functional units of the communication robot 1 will be described below with reference to FIGS. 3 and 20.

The reception unit 101 acquires, for example, information (for example, an electronic mail, blog information, news, and weather forecast) from the Internet via a network and outputs the acquired information to the recognition unit 105 and the motion generating unit 110. Alternatively, for example, when the first database 107 is over cloud, the reception unit 101 acquires information from the first database 107 over cloud and outputs the acquired information to the recognition unit 105.

The imaging unit 102 is, for example, a complementary metal oxide semiconductor (CMOS) imaging device or a charge-coupled device (CCD) imaging device. The imaging unit 102 outputs a captured image (person information which is information on a person: a still image, continuous still images, or a moving image) to the recognition unit 105 and the motion generating unit 110. The communication robot 1 may include a plurality of imaging units 102. In this case, the imaging units 102 may be attached to, for example, the front and the rear of a housing of the communication robot 1.

The sound collecting unit 103 is, for example, a microphone array including a plurality of microphones. The sound collecting unit 103 outputs acoustic signals (person information) collected by the plurality of microphones to the recognition unit 105 and the motion generating unit 110. The sound collecting unit 103 may sample the acoustic signals collected by the microphones at the same sampling rate, convert analog signals to digital signals, and output the digital signals to the recognition unit 105.

The sensor 104 includes, for example, a temperature sensor that detects the temperature of the environment, an illuminance sensor that detects the illuminance of the environment, a gyro sensor that detects an inclination of the housing of the communication robot 1, an acceleration sensor that detects movement of the housing of the communication robot 1, and an atmospheric pressure sensor that detects an atmospheric pressure. The sensor 104 outputs detected detection values to the recognition unit 105 and the motion generating unit 110.

The storage unit 106 stores, for example, items to be recognized by the recognition unit 105, various values (threshold values, constants) used for recognition, and algorithms for recognition.

The first database 107 stores, for example, a language model database, an acoustic model database, a conversation corpus database, and acoustic features used for speech recognition and a comparative image database and image features used for image recognition. The first database 107 may be located over cloud or may be connected to the communication robot 1 via a network.

The second database 109 stores, for example, data about relationships between people such as social constituents, social norms, social usages, psychology, and humanities which are used for learning. The second database 109 may be located over cloud or may be connected to the communication robot 1 via a network.

The social skill generation device 100 recognizes approaches between the communication robot 1 and a person or approaches between a plurality of persons and learns human emotional interactions on the basis of the recognized details and data stored in the second database 109. Then, the social skill generation device 100 generates social skills of the communication robot 1 from the learned details. The social skills are, for example, skills for interactions between persons such as conversations, actions, understanding, and sympathy between persons.

The recognition unit 105 recognizes approaches between the communication robot 1 and a person or approaches between a plurality of persons. The recognition unit 105 acquires an image captured by the imaging unit 102, an acoustic signal collected by the sound collecting unit 103, and a detection value detected by the sensor 104. The recognition unit 105 may acquire information received by the reception unit 101. The recognition unit 105 recognizes interactions between the communication robot 1 and a person or interactions between a plurality of persons on the basis of the acquired information and data stored in the first database 107. A recognition method will be described later. The recognition unit 105 outputs the recognized recognition result (features associated with sound and feature information associated with actions of persons) to the learning unit 108. The recognition unit 105 performs known image processing (for example, a binarization process, an edge detecting process, a clustering process, or an image feature extracting process) on the image captured by the imaging unit 102. The recognition unit 105 performs known speech recognizing processes (such as a sound source identifying process, a sound source localizing process, a noise reducing process, a speech section detecting process, a sound source extracting process, and an acoustic feature calculating process) on the acquired acoustic signal. The recognition unit 105 extracts a speech signal (or an acoustic signal) of a target person, animal, or object from the acquired acoustic signal on the basis of the recognition result and outputs the extracts speech signal (or the acoustic signal) as a recognition result to the motion generating unit 110. The recognition unit 105 extracts an image of a target person or object from the acquired image on the basis of the recognition result and outputs the extracted image as a recognition result to the motion generating unit 110.

The learning unit 108 learns human emotional interactions using the recognition result output from the recognition unit 105 and data stored in the second database 109. The learning unit 108 stores a model which has been generated by learning.

The motion generating unit 110 acquires information received by the reception unit 101, an image captured by the imaging unit 102, an acoustic signal collected by the sound collecting unit 103, and a recognition result from the recognition unit 105. The motion generating unit 110 generates an action (an utterance, an action, or an image) for a user on the basis of the learning result and the acquired information.

The image generating unit 1101 generates an output image (a still image, continuous still images, or a moving image) to be displayed on the display unit 111 on the basis of the learning result and the acquired information and displays the generated output image on the display 111. Accordingly, the motion generating unit 110 displays an animation such as a look on the display unit 111, presents an image to be presented to a user, and has communication with the user. The image to be displayed is, for example, an image corresponding to movement of eyes of a person, an image corresponding to movement of a mouth of a person, information such as a destination of a user (such as a map, a weather chart, weather forecast, or information on stores or resorts), or an image of a person giving a TV call to the user via an internet line.

The speech generating unit 1102 generates an output speech signal to be output from the speaker 112 on the basis of the learning result and the acquired information and outputs the generated output speech signal from the speaker 112. Accordingly, the motion generating unit 110 outputs a speech signal from the speaker 112 and has communication with a user. The speech signal to be output is, for example, a speech signal based on sound allocated to the communication robot 1 or a speech signal of a person giving a TV call to the user via the internet line.

The drive unit 1103 generates a drive signal for driving the actuator 113 on the basis of the learning result and the acquired information and drives the actuator 113 in accordance with the generated drive signal. Accordingly, the motion generating unit 110 can control the motion of the communication robot 1 such that an emotion or the like is expressed and communication with a user is performed.

The transmission information generating unit 1104 generates, for example, transmission information (a speech signal or an image) to be transmitted by a user to another user with which the user has a conversation via a network on the basis of the learning result and the acquired information and transmits the generated transmission information from the transmission unit 114.

The display unit 111 is, for example, a liquid crystal image display device or an organic electroluminescence (EL) image display device. The display unit 111 displays an output image output from the image generating unit 1101 of the social skill generation device 100.

The speaker 112 outputs an output speech signal output from the speech generating unit 1102 of the social skill generation device 100.

The actuator 113 drives the movable part in accordance with the drive signal output from the drive unit 1103 of the social skill generation device 100.

The transmission unit 114 transmits the transmission information output from the transmission information generating unit 1104 of the social skill generation device 100 to a destination via a network.

(Flows of Recognition, Learning, and Social Skills)

The communication robot 1 may generate a social skill of a robot such that an emotional connection between the robot and a person can be formed and perform communication with a person, for example, according to a response or an action of the person.

Figure 21:
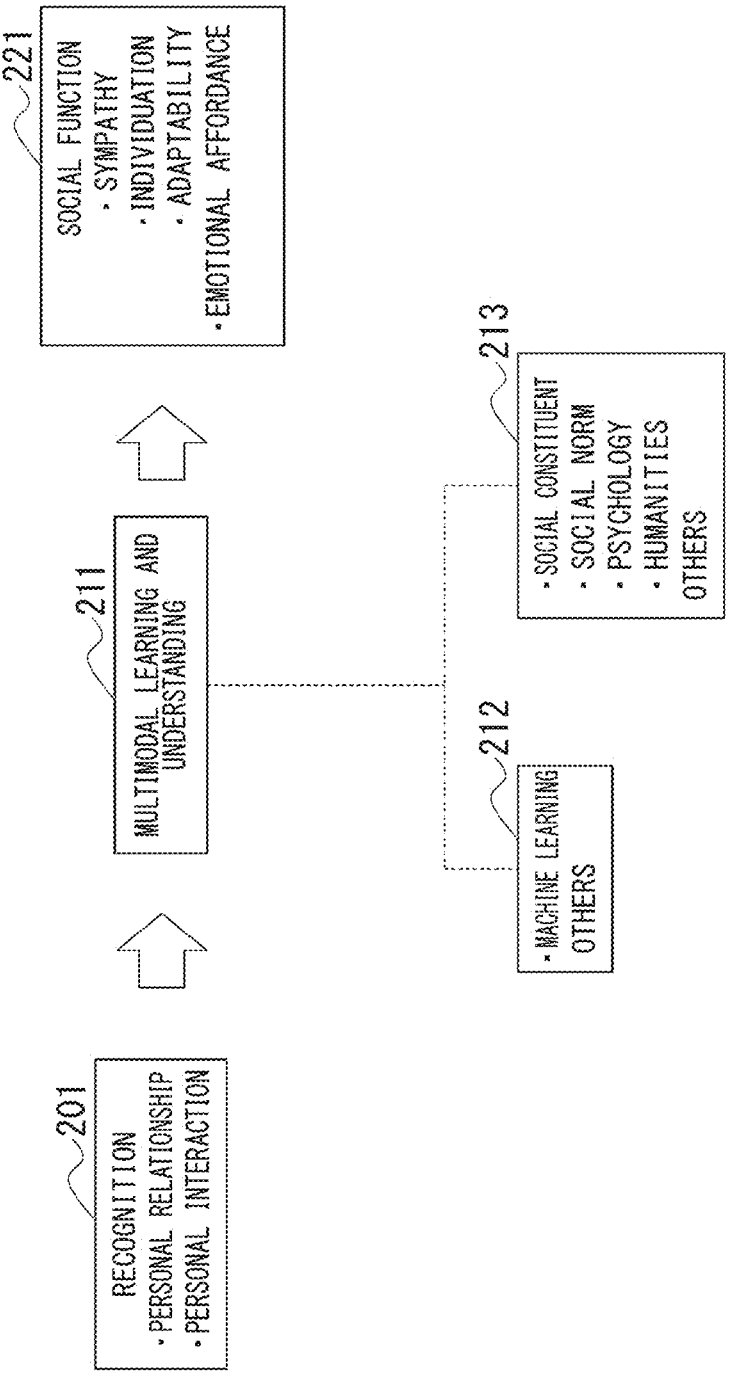
FIG. 21 is a diagram illustrating recognition, learning, and social capability which are performed by the communication robot according to the embodiment.

A flow of recognition and learning which is performed by the communication robot 1 will be described below. FIG. 21 is a diagram illustrating a flow of recognition, learning, and a social skill which is performed by the communication robot according to this embodiment.

A recognition result 201 is an example of the recognition result from the recognition unit 105. The recognition result 201 is, for example, a personal relationship or a personal interrelationship.

Multimodal learning and understanding 211 is an example of learning details performed by the learning unit 108. A learning method 212 is machine learning or the like. A learning target 213 is, for example, social constituents, social norms, psychology, or humanities.

A social skill 221 is a social function and examples thereof include sympathy, individuation, adaptability, and emotional affordance.

(Data to be Recognized)

An example of data recognized by the recognition unit 105 will be described below.

Figure 22:
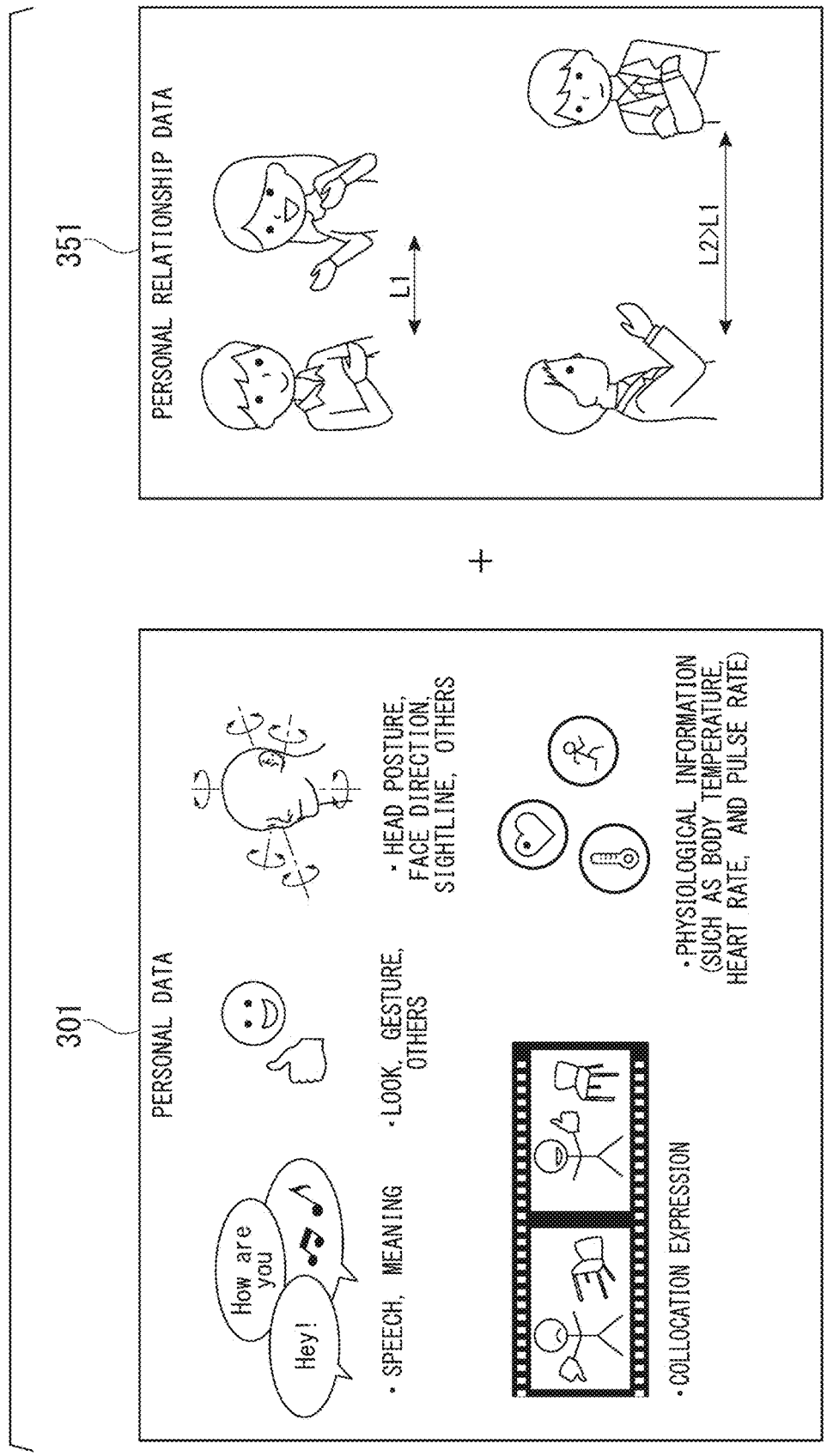
FIG. 22 is a diagram illustrating an example of data which is recognized by a recognition unit according to the embodiment.

FIG. 22 is a diagram illustrating an example of data recognized by the recognition unit according to this embodiment. In the embodiment, the recognition unit recognizes personal data 301 and personal relationship data 351, as illustrated in FIG. 22.

Personal data is an action performed by a single person and is data acquired by the imaging unit 102 and the sound collecting unit 103 and data obtained by performing a speech recognizing process, an image recognizing process, and the like on the acquired data. Examples of the personal data include speech data, meaning data which is a result of speech processing, a sound volume, a sound intonation, uttered words, look data, gesture data, head posture data, face direction data, sightline data, collocation expression data, and physiological information (such as a body temperature, a heart rate, and a pulse rate). What data is to be used may be selected, for example, by designer of the communication robot 1. In this case, for example, for actual communication between two persons or demonstration, the designer of the communication robot 1 may set significant features of personal data in communication. The recognition unit 105 recognizes an emotion of a user as personal data on the basis of the acquired utterance and information extracted from images. In this case, the recognition unit 105 performs recognition, for example, on the basis of a sound volume or intonation, an utterance duration time, or a look. The communication robot 1 according to this embodiment is controlled such that a good emotion of the user is kept and a good relationship with the user is kept.

An example of a method of recognizing a social background (background) of a user will be described below.

The recognition unit 105 estimates nationality, a native place, and the like of the user on the basis of the acquired utterance and image and data stored in the storage unit 106. The recognition unit 105 extracts a daily schedule such as wake-up time, going-out time, going-home time, and bed time of a user on the basis of the acquired utterance and image and data stored in the storage unit 106. The recognition unit 105 estimates sex, age, job, hobby, career, taste, family structure, religious belief, affinity with the communication robot 1 of the user on the basis of the acquired utterance and image, the extracted daily schedule, and data stored in the storage unit 106. Since the social background may change, the communication robot 1 updates information on the social background of the user on the basis of conversations, images, and data stored in the storage unit 106. In order to enable emotional sharing, the social background or the affinity with the communication robot 1 is not limited to an input level such as age, sex, or carrier, but is recognized, for example, on the basis of emotional ups and downs by time periods or a sound volume or intonation for a topic. In this way, the recognition unit 105 learns details which have not been recognized by a user itself on the basis of daily conversations, looks in the conversations, and the like.

The personal relationship data is data associated with a relationship between a user and another user. Social data can be used by using the personal relationship data in this way. The personal relationship data is, for example, a distance between a person and a person, whether sightlines of persons having a conversion meet each other, a sound intonation, or a sound volume. The distance between a person and a person differs according to a personal relationship as will be described later. For example, a personal relationship of a married couple is L1, and a personal relationship between business men is L2 which is greater than L1.

For example, for actual communication or demonstration between two persons, the designer of the communication robot 1 may set significant features of personal data in communication. The personal data, the personal relationship data, and the information on a social background of a user are stored in the storage unit 106.

When a user includes a plurality of persons, for example, when a user includes the user and a family member thereof, the recognition unit 105 collects and learns personal data for each user and estimates a social background for each person. This social background may be acquired, for example, via a network and the reception unit 101. In this case, the user may input a social background of the user or input an item, for example, using a smartphone.

An example of the recognition method of personal relationship data will be described below.

The recognition unit 105 estimates a distance (interval) between a person and a person having communication on the basis of the acquired utterance and image and the data stored in the storage unit 106. The recognition unit 105 detects whether sightlines of persons having communication meet each other on the basis of the acquired utterance and image and the data stored in the storage unit 106. The recognition unit 105 estimates a friendship, a fellowship, or a family membership on the basis of the acquired utterance and the data stored in the storage unit 106, that is, on the basis of utterance details, a sound volume, a sound intonation, received electronic mails, transmitted electronic mails, and partners of transmission/reception destinations of transmitted/received electronic mails.

The recognition unit 105 may randomly select one combination out of combinations of some social backgrounds stored in the storage unit 106 and initial values of personal data in an initial state of use and start communication. Then, the recognition unit 105 may select another combination again when it is difficult to continue to communicate with a user with actions generated from the randomly selected combination.

(Learning Sequence)

In this embodiment, the learning unit 108 performs learning using personal data 301 and personal relationship data 351 recognized by the recognition unit 105 and data stored in the storage unit 106.

A social construction and a social norm will be described below. In a space in which persons participate in social interactions, personal relationships differ depending on, for example, distances between a person and a person. For example, a relationship in which the interval between a person and a person ranges from 0 cm to 50 cm is an intimate relationship, and a relationship in which the interval between a person and a person ranges from 50 cm to 1 m is a personal relationship. A relationship in which the interval between a person and a person ranges from 1 m to 4 m is a social relationship, and a relationship in which the interval between a person and a person is equal to or greater than 4 m is a public relationship. This social norm is used for learning with whether an action or an utterance matches a social norm as a reward (an implicit reward).

The personal relationship may be set by setting features of rewards at the time of learning according to an environment or users. Specifically, a rule not to talk much is set for a person not good at a robot, a rule to actively talk is set for a person good at a robot, and settings of a plurality of affinities may be provided in this way. In actual environments, the recognition unit 105 may recognize what type a user is on the basis of a processing result of an utterance and an image of the user, and the learning unit 108 may select a rule.

A human trainer may evaluate actions of the communication robot 1 and provide a reward (an implicit reward) according to a social construction or norm which is known to the human trainer.

Figure 23:
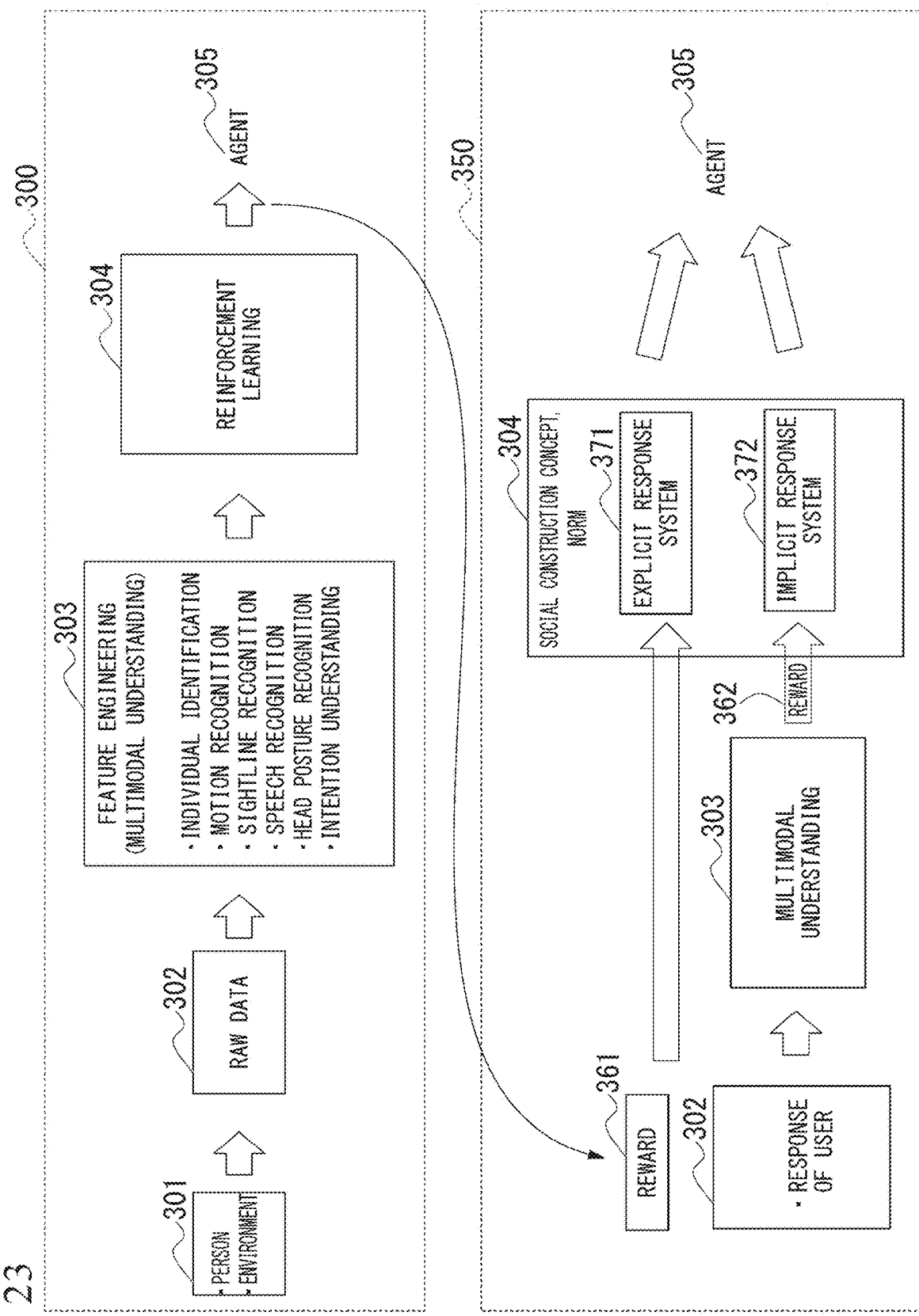
FIG. 23 is a diagram illustrating an example of an agent preparing method which is used by a motion processing unit according to the embodiment.
Figure 24:
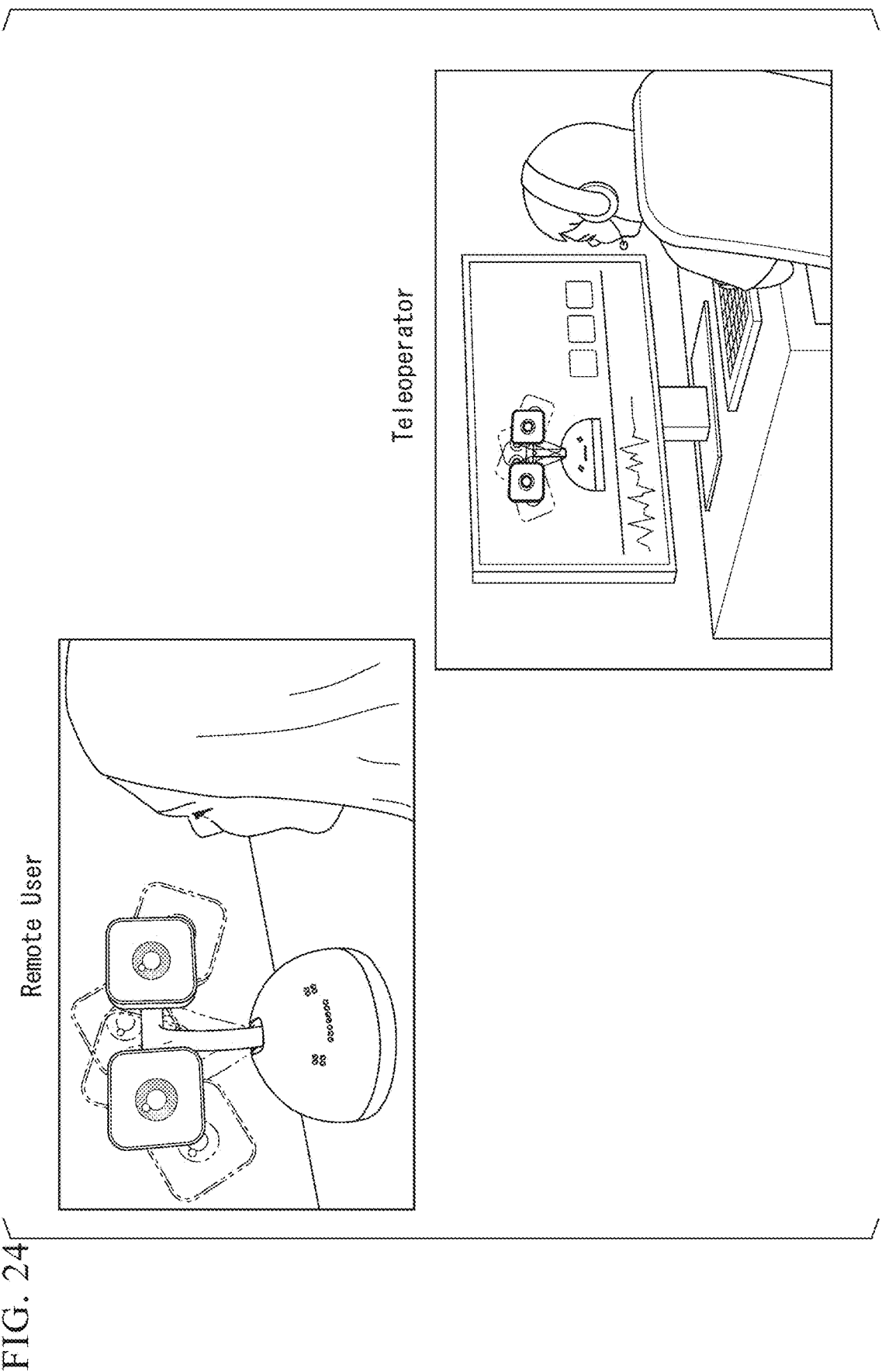
FIG. 24 is a diagram illustrating a situation in which a remote operator sets a robot.

FIG. 23 is a diagram illustrating an example of an agent preparing method used by a motion processing unit according to this embodiment.

An area indicated by reference sign 300 illustrates a flow from input to preparation and output of an agent.

An image captured by the imaging unit 102 and information 310 collected by the sound collecting unit 103 are information on persons (a user, a person relevant to the user, and another person) and environmental information of the persons. Raw data 302 acquired by the imaging unit 102 and the sound collecting unit 103 is input to the recognition unit 105.

The recognition unit 105 extracts and recognizes a plurality of pieces of information (such as a sound volume, a sound intonation, utterance details, uttered words, a sightline of a user, a head posture of a user, a face direction of a user, biological information of a user, a distance between a person and a person, or whether sightlines of persons meet each other) from the input raw data 302. The recognition unit 105 performs multimodal understanding, for example, through a neural network using the extracted and recognized information.

The recognition unit 105 identifies an individual, for example, on the basis of at least one of a speech signal and an image and allocates identification information (ID) to the identified individual. The recognition unit 105 recognizes a motion of the identified individual on the basis of at least one of the speech signal and the image. The recognition unit 105 recognizes a sightline of the identified individual, for example, by performing known image processing and tracking on the image. The recognition unit 105 recognizes speech, for example, by performing a speech recognizing process (such as sound source identification, sound source localization, sound source separation, utterance section detection, and noise reduction) on the speech signal. The recognition unit 105 recognizes the head posture of the identified individual, for example, by performing known image processing on the image. For example, when two persons appear in a captured image, the recognition unit 105 recognizes a personal relationship on the basis of utterance details, an interval between the two persons in the captured image, and the like. The recognition unit 105 recognizes (estimates) a social distance between the communication robot 1 and the user, for example, on the basis of processing results of the captured image and the collected speech signal.

The learning unit 108 performs reinforcement learning 304 instead of deep learning. In reinforcement learning, learning is performed such that features with a highest relationship (including a social construction or a social norm) are selected. In this case, a plurality of pieces of information used for multimodal understanding are used as features for input. For example, raw data itself, a name ID (identification information), a face direction, a recognized gesture, and a keyword from speech are input to the learning unit 108. An action of the communication robot 1 is output from the learning unit 108. The output action can be defined according to purposes and examples thereof include a speech response, a routine of a robot, and an angle in a rotating direction of a robot. In multimodal understanding, a neural network or the like may be used for detection. In this case, human activity may be detected using modalities of different bodies. What feature is to be used may be selected in advance, for example, by a designer of the communication robot 1. In this embodiment, the concept of a social norm or a social construction can be used by using an implicit reward and an explicit reward for learning. A result of reinforcement learning is output as an agent 305. In this way, in this embodiment, an agent which is used by the motion generating unit 110 is prepared.

An area indicated by reference sign 350 illustrates a reward using method.

An implicit reward 362 is used to learn an implicit response. In this case, the raw data 302 includes responses of users, and this raw data 302 is subjected to the multimodal understanding 303. The learning unit 108 generates an implicit response system 372 using the implicit reward 362, a social norm stored in the storage unit 106, and the like. An implicit reward may be acquired through reinforcement learning or may be given by a person. The implicit response system may be a model which is acquired through learning.

In learning of an explicit response, for example, a human trainer evaluates an action of the communication robot 1 and gives a reward 361 according to a social configuration or a social norm which is known to the human trainer. The agent employs an action with a maximum reward in response to an input. Accordingly, the agent employs an action (utterance or action) which can maximize a positive emotion of a user.

The learning unit 108 generates an explicit response system 371 using the explicit response 361. The explicit response system may be a model which is acquired through learning. An explicit reward may be given by allowing a user to evaluate an action of the communication robot 1, or the explicit reward may be estimated, for example, on the basis of whether the communication robot 1 has performed an action desired by the user on the basis of an utterance or an action (such as an action or a look) of the user.

The learning unit 108 outputs an agent 305 using this trained model at the time of operation.

In this embodiment, for example, an explicit reward which is a response of a user has priority to an implicit reward. This is because a response of a user has higher reliability in communication.

A program for realizing some or all functions of the remote operation device 2 or the communication robot 1 according to the present invention may be recorded on a computer-readable recording medium, and some or all functions of the remote operation device 2 or the communication robot 1 may be performed by causing a computer system to read and execute the program recorded on the recording medium. The "computer system" mentioned herein includes an operating system (OS) or hardware such as peripherals. The "computer system" includes a homepage provision environment (or a homepage display environment) when a WWW system is used. The "computer-readable recording medium" includes a portable medium such as a CD, a DVD, or a USB and a storage device such as a hard disk incorporated into a computer system. The "computer-readable recording medium" may include a medium that holds a program for a predetermined time such as a volatile memory (RAM) in a computer system serving as a server or a client when the program is transmitted via a network such as the Internet or a communication line such as a telephone line. The program may be stored on cloud. Some or all functions of the remote operation device 2 or the communication robot 1 may be realized by devices on cloud.

The program may be transmitted from a computer system in which the program is stored in a storage device or the like to another computer system via a transmission medium or using carrier waves in the transmission medium. Here, the "transmission medium" for transmitting a program is a medium having a function of transmitting information such as a network (a communication network) such as the Internet or a communication circuit (a communication line) such as a telephone line. The program may be a program for realizing some of the aforementioned functions. The program may be a program, that is, a so-called differential file (a differential program), for realizing the aforementioned functions in combination with a program recorded in advance in the computer system.

While an embodiment of the present invention has been described above, the present invention is not limited to the embodiment and can be subjected to various modifications and substitutions without departing from the gist of the present invention.

REFERENCE SIGNS LIST

7 Remote operation system
1 Communication robot
2 Remote operation device
21 Communication unit
22 Learning device
23 Storage unit
24 Operation unit
25 Image generating unit
26 Image display unit
27 Speech processing unit
28 Speech output unit

The invention claimed is:

1. A learning device comprising:
   an acquisition unit configured to acquire a recognition result by recognizing intention indication information of a user who uses a communication robot;
   a presentation unit configured to generate a plurality of action sets of the communication robot corresponding to the recognition result on the basis of the acquired recognition result and to present the generated plurality of action sets to a remote operator who remotely operates the communication robot from a remote location;
   an operation result detecting unit configured to detect a selection state of the remote operator which is an operation selected by the remote operator for the presented plurality of action sets; and
   a learning unit configured to determine a reward in learning on the basis of the detected selection state of the remote operator and to learn a response of the communication robot to the user's action.

2. The learning device according to claim 1, wherein the selection state of the remote operator includes a selected state and a non-selected state, and
   wherein the learning unit gives a first reward to a selected action, gives a negative second reward to the other actions not selected out of the plurality of action sets, and gives a negative third reward which is greater than the second reward when none of the plurality of action sets are selected.

3. The learning device according to claim 1, wherein y is a discount factor, $s_t$ is a state, s' is a next state of the user, a is an action with a maximum Q value with respect to s', $a_i$ is an i-th action which is selected by the communication robot and which is transmitted to the remote operator, and Q(·) is a Q value in Q-learning, and
   wherein the learning unit uses the reward $R_h$ to calculate a time difference error $\delta_t$ using a following expression:

$$\delta_t = R_h + \gamma \max_a Q(s', a) - Q(s_t, a_i).$$

4. The learning device according to claim 3, wherein the learning unit uses the time difference error $\delta_t$ to update the Q value of the action set recommended in the state $s_t$ using a following expression:

$$Q(s_t, a_i) = Q(s_t, a_i) + \alpha \delta_t.$$

5. The learning device according to claim 4, wherein the learning unit selects another action set of which the Q value is highly ranked for recommendation when a new state $s_{t+1}$ is detected at time t+1 using a following expression:

$$a \leftarrow \operatorname{argmax}_a Q(s_{t+1}, a_i).$$

6. The learning device according to claim 1, wherein the intention indication information is at least one of a speech recognition state in which utterance intention of a speech signal of the user is recognized, a look recognition state in which a look of the user is recognized, and a gesture recognition state in which a motion of the user is recognized.

7. The learning device according to claim 6, wherein the gesture recognition state includes tracking movement of a face or a body of the user using an image in which a gesture of the user is imaged, continuously acquiring joint positions of the user, dividing a data stream into segments on the basis of characteristics of movement of a designated landmark joint, converting a new trajectory of a series of joint positions to a feature set of angles and distances when the new trajectory of a series of joint positions is prepared, preparing an image of movement by rescaling acquired feature segments to standard lengths using cubic interpolation, and evaluating the acquired image of movement to acquire a necessary class label.

8. A learning method comprising:
   causing an acquisition unit to acquire a recognition result by recognizing intention indication information of a user who uses a communication robot;
   causing a presentation unit to generate a plurality of action sets of the communication robot corresponding to the recognition result on the basis of the acquired recognition result and to present the generated plurality of action sets to a remote operator who remotely operates the communication robot from a remote location;
   causing an operation result detecting unit to detect a selection state of the remote operator which is an operation selected by the remote operator for the presented plurality of action sets; and
   causing a learning unit to determine a reward in learning on the basis of the detected selection state of the remote operator and to learn a response of the communication robot to the user's action.

9. A non-transitory computer-readable storage medium storing a program causing a computer to perform:
   acquiring a recognition result by recognizing intention indication information of a user who uses a communication robot;
   generating a plurality of action sets of the communication robot corresponding to the recognition result on the basis of the acquired recognition result and presenting the generated plurality of action sets to a remote operator who remotely operates the communication robot from a remote location;
   causing an operation result detecting unit to detect a selection state of the remote operator which is an operation selected by the remote operator for the presented plurality of action sets; and
   determining a reward in learning on the basis of the detected selection state of the remote operator and learning a response of the communication robot to the user's action.

* * * * *